US006976046B2

(12) United States Patent
Guevorkian et al.

(10) Patent No.: US 6,976,046 B2
(45) Date of Patent: Dec. 13, 2005

(54) ARCHITECTURES FOR DISCRETE WAVELET TRANSFORMS

(75) Inventors: David Guevorkian, Tampere (FI); Petri Liuha, Tampere (FI); Aki Launiainen, Tampere (FI); Ville Lappalainen, Tampere (FI)

(73) Assignee: Nokia Corporation, Espoo (FI)

( * ) Notice: Subject to any disclaimer, the term of this patent is extended or adjusted under 35 U.S.C. 154(b) by 690 days.

(21) Appl. No.: 09/872,682

(22) Filed: Jun. 1, 2001

(65) Prior Publication Data

US 2003/0065489 A1 Apr. 3, 2003

(51) Int. Cl.[7] .............................................. G06F 17/14
(52) U.S. Cl. ...................................... 708/400; 382/276
(58) Field of Search ......................... 708/400; 382/276

(56) References Cited

U.S. PATENT DOCUMENTS

| 6,148,111 | A | * | 11/2000 | Creusere | .................... | 382/240 |
|---|---|---|---|---|---|---|
| 6,466,957 | B1 | * | 10/2002 | Messerly et al. | ........... | 708/300 |
| 6,584,111 | B1 | * | 6/2003 | Aweya et al. | ................ | 370/412 |
| 6,684,235 | B1 | * | 1/2004 | Turney et al. | .............. | 708/400 |
| 6,785,700 | B2 | * | 8/2004 | Masud et al. | ............... | 708/400 |
| 2002/0107899 | A1 | * | 8/2002 | Masud et al. | ............... | 708/400 |
| 2003/0018599 | A1 | * | 1/2003 | Weeks | .......................... | 706/15 |

OTHER PUBLICATIONS

"A Theory for Multiresolution Signal Decomposition: The Wavelet Representation," Mallat, IEEE Trans. on Pattern Analysis and Machine Intelligence, vol. 2, No. 12, 1989, pp. 674–693.
"Wavelets and Subband Coding," Vetterli et al., Prentice Hall, 1995, relevant pages thereof.
"Ten Lectures on Wavelets," Daubachies, Society for Industrial and Applied Mathematics, 1992, relevant pages thereof.
"The Wavelet Transform Time Frequency, Localization and Signal Analysis," Daubechies, IEEE Trans. on Information Theory, vol. 36, No. 5, 1990, pp. 961–1005.
"Fast Wavelet Transforms and Numerical Algorithms I," Beylkin et al., Yale Univ., 1989, pp. 1–41.
"Interictal EEG Spike Detection: A New Framework Based on The Wavelet Transform," Senhadji et al., Proc. IEEE–SP Int. Symp. Time–Frequency Time–Scale Anal., 1994, pp. 548–551.
"Multifrequency Channel Decompositions of Images and Wavelet Models," Mallat, IEEE Trans. on Acoust., Speech and Signal Processing, vol. 37, No. 12, 1989, pp. 2091–2110.
"Short–Length FIR Filters and Their Use in Fast Nonrecursive Filtering," Mou et al., IEEE Trans. on Signal Processing, vol. 39, No. 6, 1991, pp. 1322–1332.
"New Systolic Arrays for Computation of the 1–D Discrete Wavelet Transform," Pan et al., Proceedings of the IEEE International Conference on Acoustics, Speech, and Signal Processing, 1997, vol. 5, 1997, pp. 4113–4116.

(Continued)

*Primary Examiner*—D. H. Malzahn
(74) *Attorney, Agent, or Firm*—Perman & Green, LLP.

(57) ABSTRACT

A microprocessor structure for performing a discrete wavelet transform operation, said discrete wavelet transform operation comprising decomposition of an input signal comprising a vector of r×k[m] input samples, r, k and m being non-zero positive integers, over a specified number of decomposition levels j, where j is an integer in the range 1 to J, starting from a first decomposition level and progressing to a final decomposition level, said microprocessor structure having a number of processing stages, each of said number of processing stages corresponding to a decomposition level j of the discrete wavelet transform operation and being implemented by a number of basic processing elements, the number of basic processing elements implemented in each of said processing stages decreasing by a factor of k from a decomposition level j to a decomposition level j+1.

44 Claims, 16 Drawing Sheets

The general structure of Type 1 and Type 2 coarse DWT architectures

OTHER PUBLICATIONS

"An Efficient VLSI Architecture for the Computation of 1–D Discrete Wavelet Transform," Premkumar et al., Proc. of the IEEE Int. Conf. On Information, Communications and Signal Processing, 1997, pp. 1180–1184.

"VLSI Architectures for the Discrete Wavelet Transform," Vishwanath et al., IEEE Trans. on Circuits and Systems II: Analog and Digital Signal Processing, vol. 42, No. 5, 1995, pp. 305–316.

"Discrete Wavelet Transform: Data Dependence Analysis and Synthesis of Distributed Memory and Control Array Architectures," Fridman et al., IEEE Trans. on Signal Processing, vol. 45, n. 5, 1997, pp. 1291–1308.

"VLSI Architectures for Discrete Wavelet Transforms," Parhi et al., IEEE Trans. on VLSI Systems, vol. 1, No. 2, 1993, pp. 191–202.

"Systolic VLSI Architectures for 1–D Discrete Wavelet Transforms," Denk et al., Proceedings of the Thirty–Second Asilomar Conference on Signals, Systems & Computers, 1998, vol. 2 pp. 1220–1224.

"VLSI Architecture for the Discrete Wavelet Transform," Knowles, Electronics Letters, vol. 26, No. 15, 1990, pp. 1184–1185.

"Efficient Realizations of Discrete and Continuous Wavelet Transforms: From Single Chip Implementations to Mappings on SIMD Array Computers," Chakrabarti et al., IEEE Trans. on Signal Processing, vol. 43, No. 3, 1995, pp. 759–771.

"Architectures for Wavelet Transforms: A Survey," Chakrabarti et al., Journal of Signal Processing, vol. 14, No. 2, 1996.

"VLSI Implementation of Discrete Wavelet Transform," Grzeszczak et al., IEEE Trans. on VLSI Systems, vol. 4, No. 4, 1996, pp. 421–433.

"A Common Architecture for the DWT and IDWT," Vishwanath et al., Proceedings of IEEE Int. Conf. on Application Specific System, Architectures and Processors, 1996, pp. 193–198.

"Design and Implementation of a Highly Efficient VLSI Architecture for Discrete Wavelet Transform," Yu et al., Proceedings of IEEE Int. Conf. on Custom Integrated Circuits, 1997, pp. 237–240.

"A Scalable Architecture for Discrete Wavelet Transform," Syed et al., Proceedings of Computer Architectures for Machine Perception (CAMP '95), 1995, pp. 44–50.

"The Recursive Pyramid Algorithm for the Discrete Wavelet Transform," Vishwanath, IEEE Transactions on Signal Processing, vol. 42, No. 3, 1994, pp. 673–677.

"Trading Speed for Low Power by Choice of Supply and Threshold Voltages," Liu et al., IEEE Journal of Solid State Circuits, vol. 28, No. 1, 1993, pp. 10–17.

"High–Speed/Low–Power 1–D DWT Architectures with High Efficiency," Marino et al., Proceedings of the IEEE International Conference on Circuits and Systems, 2000, vol. 5, pp. 337–340.

"Computational Aspects of Discrete Linear Transforms and Rank Order Based Filters", D.Z. Gevorkian, Thesis for the degree of Doctor of Technology, 1997, relevant pages.

"Parallel Algorithms and Architectures for a Family of Haar–like Transforms," Astola et al., Proceedings of SPIE's International Symposium Electronic Imaging: Science and Technology, vol. 2421, 1995.

Eusipco 2000 CD–ROM Proceedings, "Highly Efficient Fast Architectures for Discrete Wavelet Transforms Based on Their Flowgraph Representation", Gevorkian et al., X European Signal Processing Conference, 2000.

"TMS320C6000™ Highest Performance DSP Platform," 3 page document.

"Architectures for Digital Signal Processing," P. Pirsch, J. Wiley & Sons, 1998, relevant pages thereof.

"Wavelets in Numerical Analysis", Beylkin et al., Jones and Bartlett, 1992, pp. 181–210.

"Mutliresolution Signal Decomposition: Transforms, Subbands and Wavelets," Akansu et al., Academic Press, Inc., 1992, relevant pages thereof.

"Why Systolic Architectures?" H. T. Kung, IEEE Computer, 1982, 10 page document.

"Analysis of Sound Patterns through Wavelet Transform", R. Kronland–Martinet et al., Int. Journ. Pattern Recognition and Artificial Intell., vol. 1, No. 2, 1987, pp. 273–302.

* cited by examiner

Figures
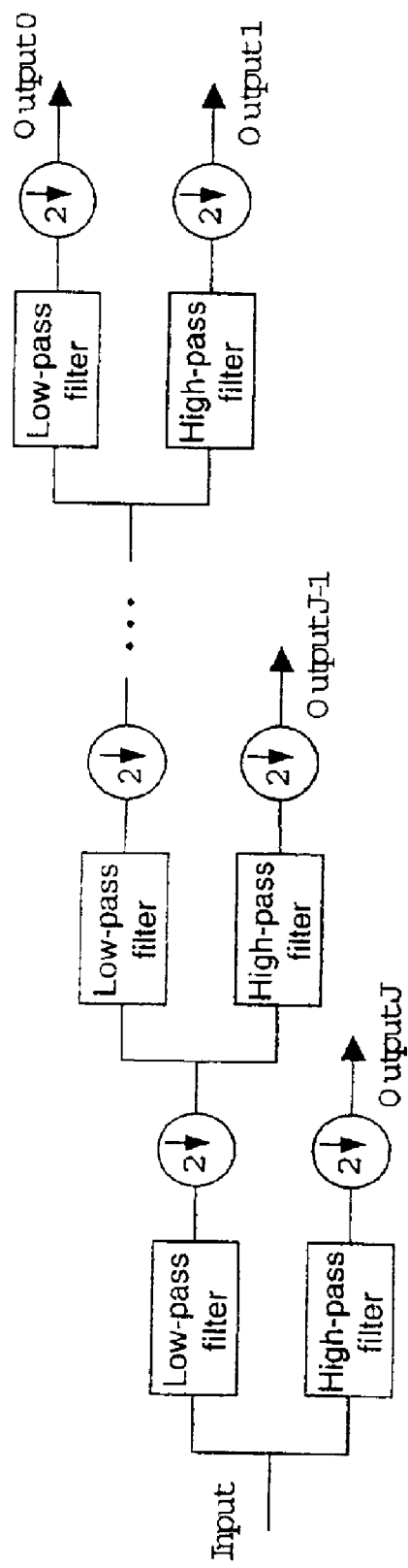
Figure 1. Tree-structured representation of a 1-D discrete wavelet transform

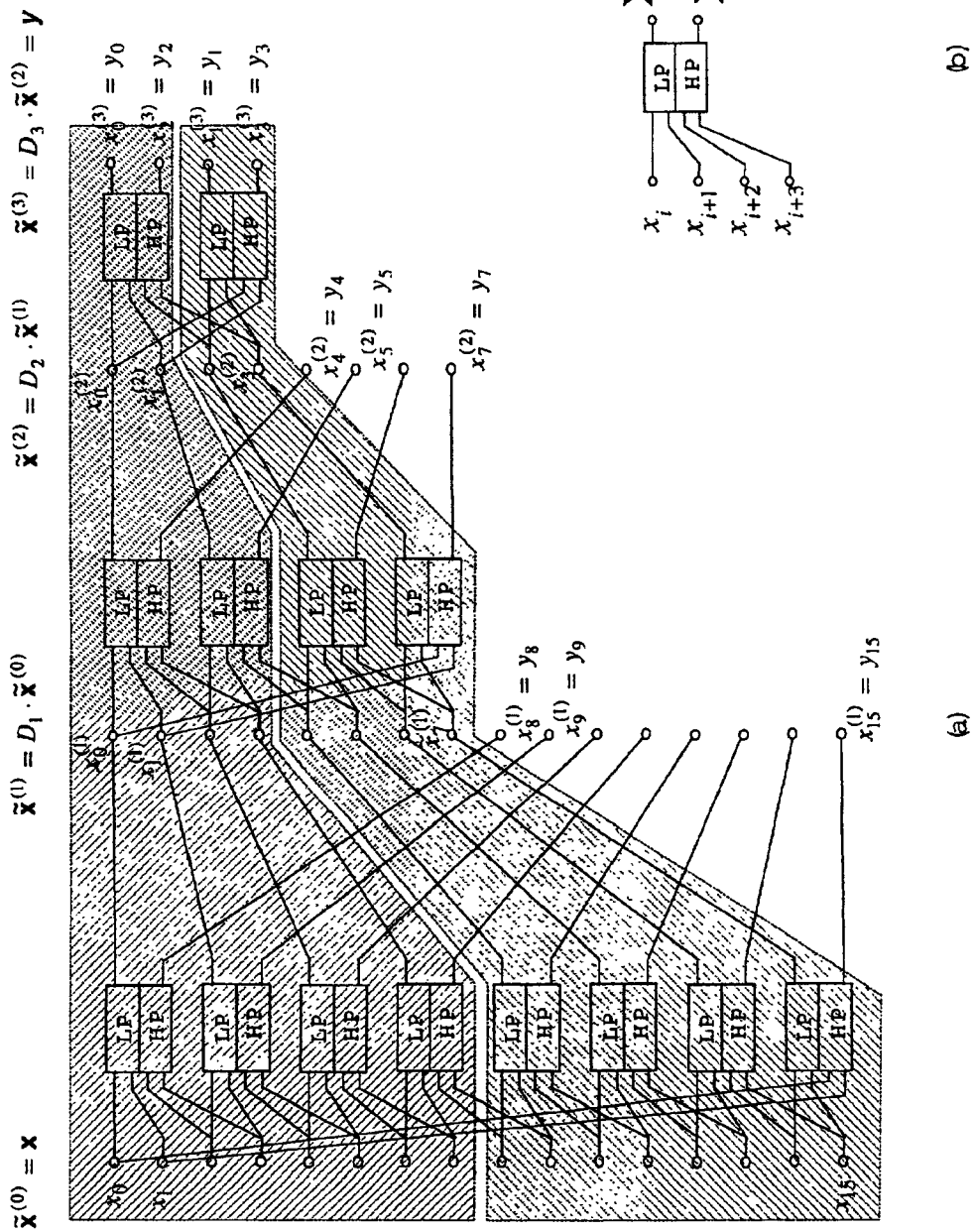
Figure 2. Flow graph representation of a 1-D discrete wavelet transform (N=16, L=4, J=3)

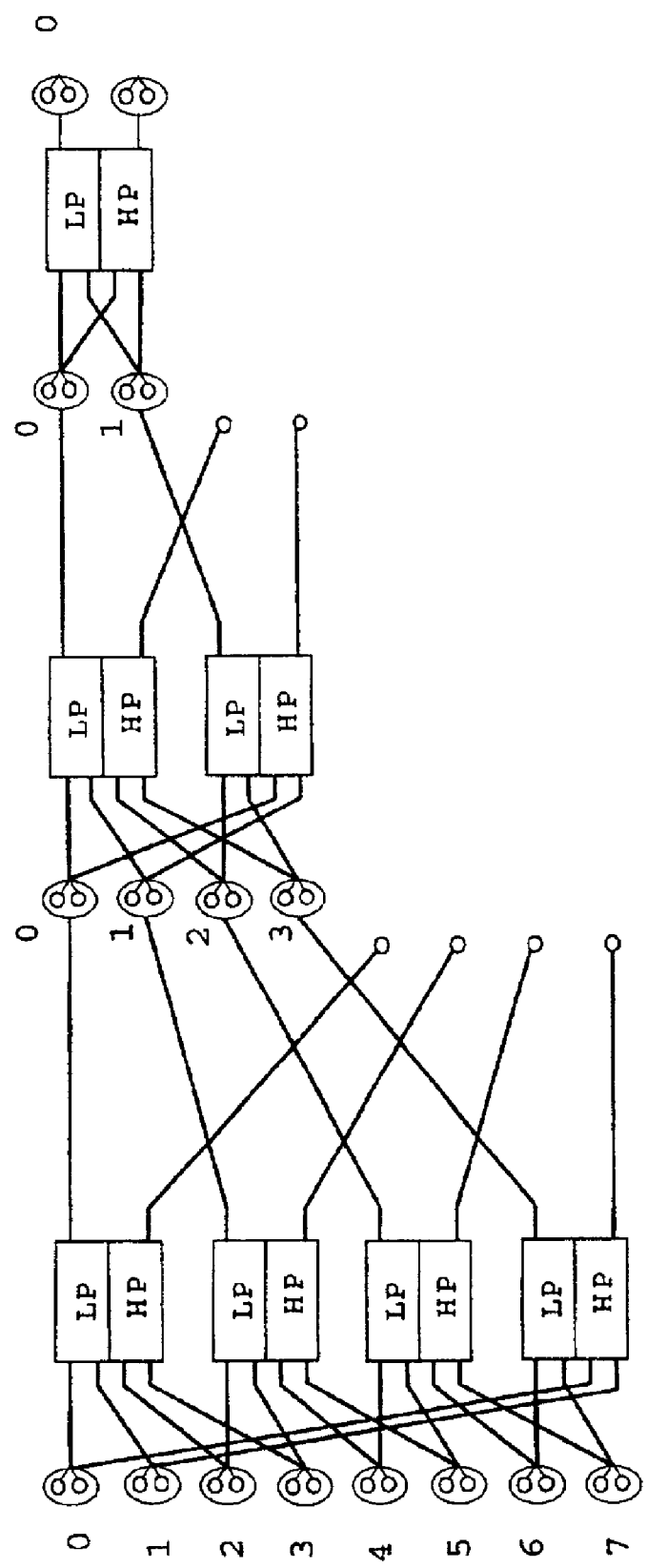
Figure 3. Compact flow graph representation of a 1-D DWT (L=4, J=3)

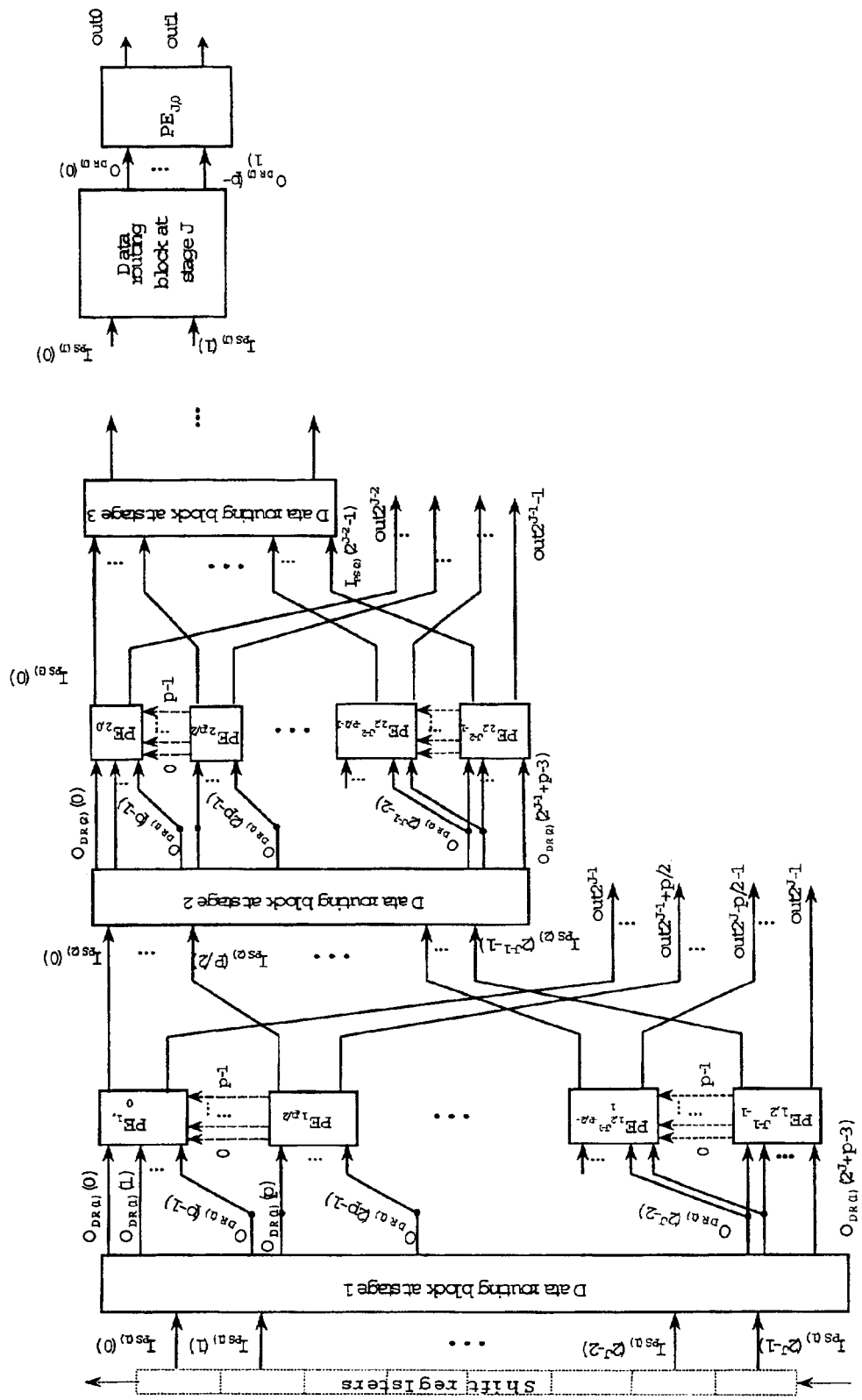
Figure 4. The general structure of Type 1 and Type 2 core DWT architectures

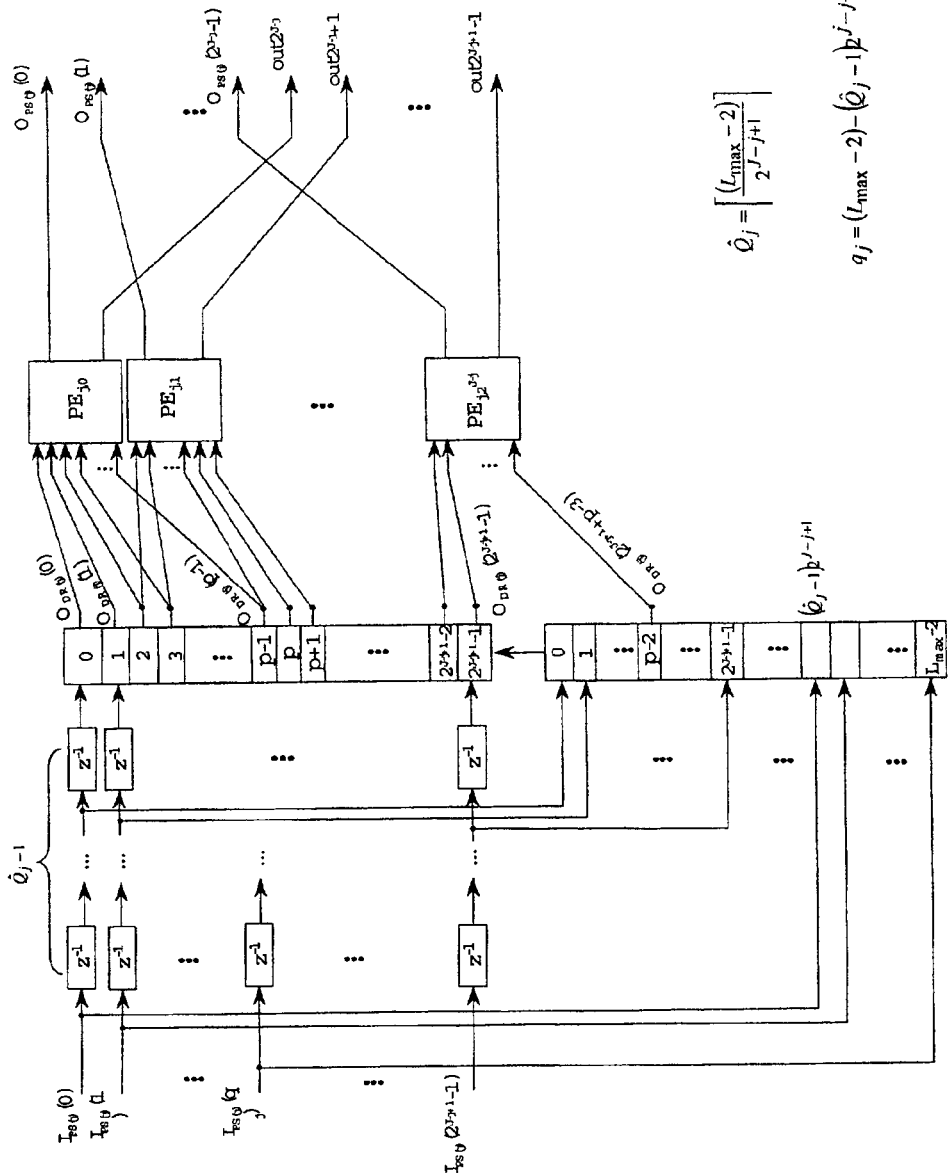
Figure 5. A realization of the $j$th pipeline stage, $j=1...J$, of the Type 1 core DWT architecture

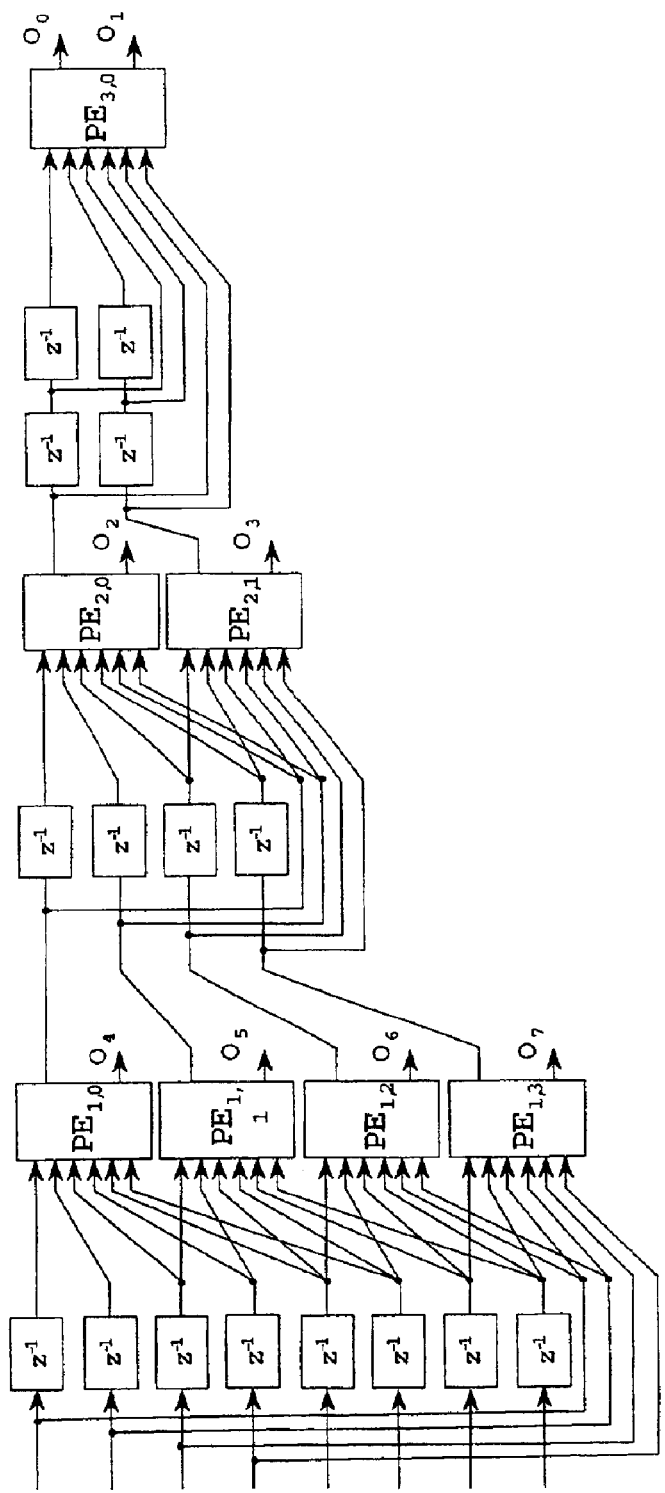
Figure 6. An example of realization of the Type 1 core DWT architecture for the case $L_{max} = 6$; $J = 3$; $N = 2^m$, $m = 3, 4, ...$

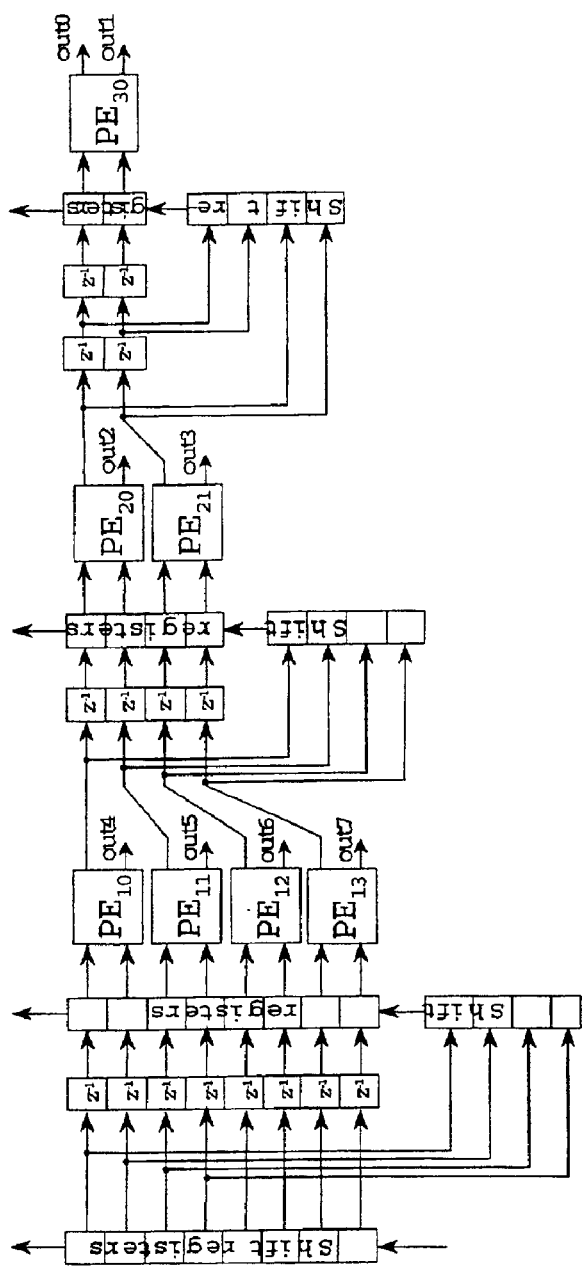
Figure 7. An example of realization of the Type 1 core DWT Architecture for the case $L_{max}=6$; $J_{max}=3$; $p=2$; $N=2^m$, $m=3,4,...$ :

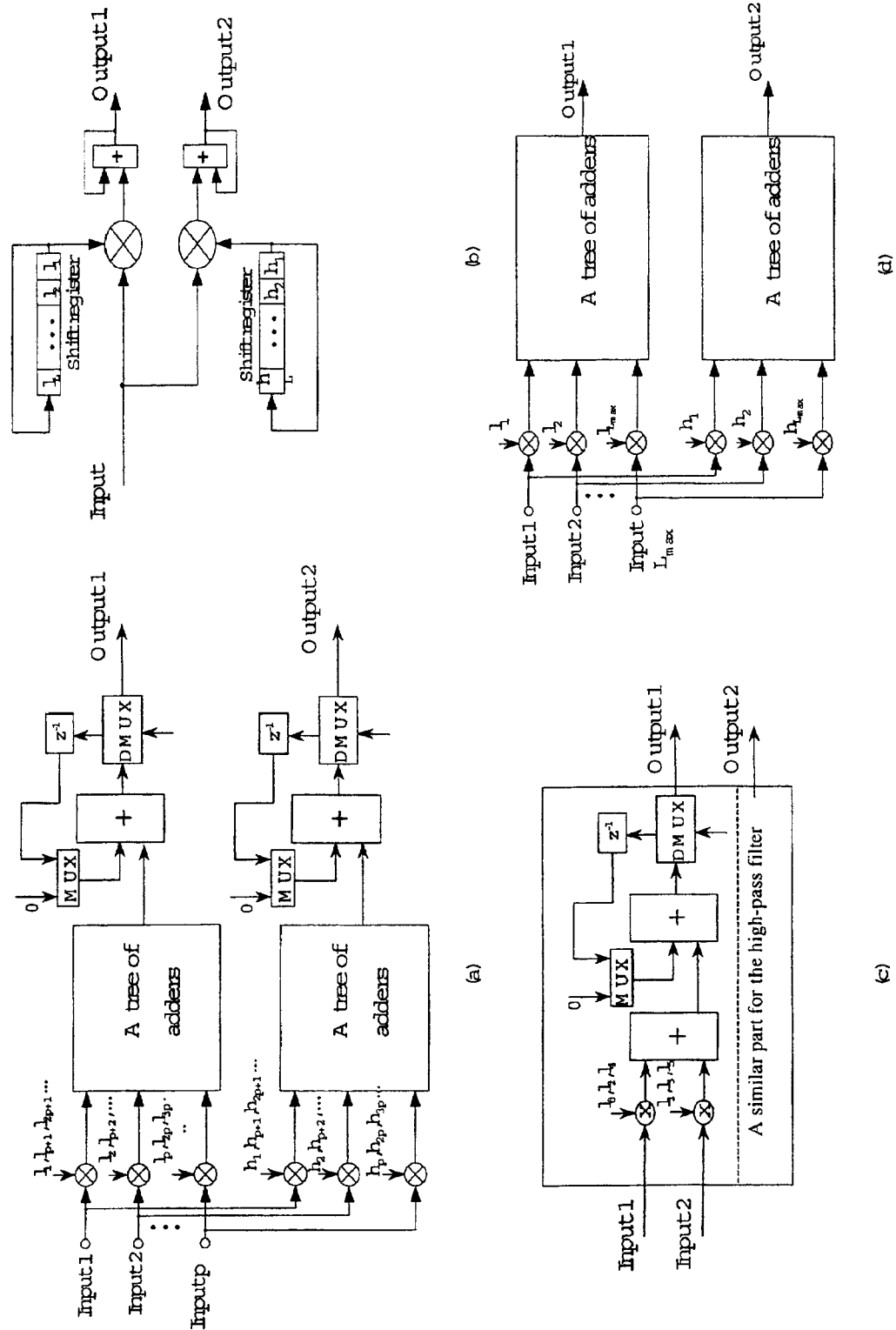
Figure 8. Possible structures for the PEs used in Type 1 core DWT architecture: (a) arbitrary $p$; (b) $p=1$; (c) $p=2$; (d) $p=L_{max}$

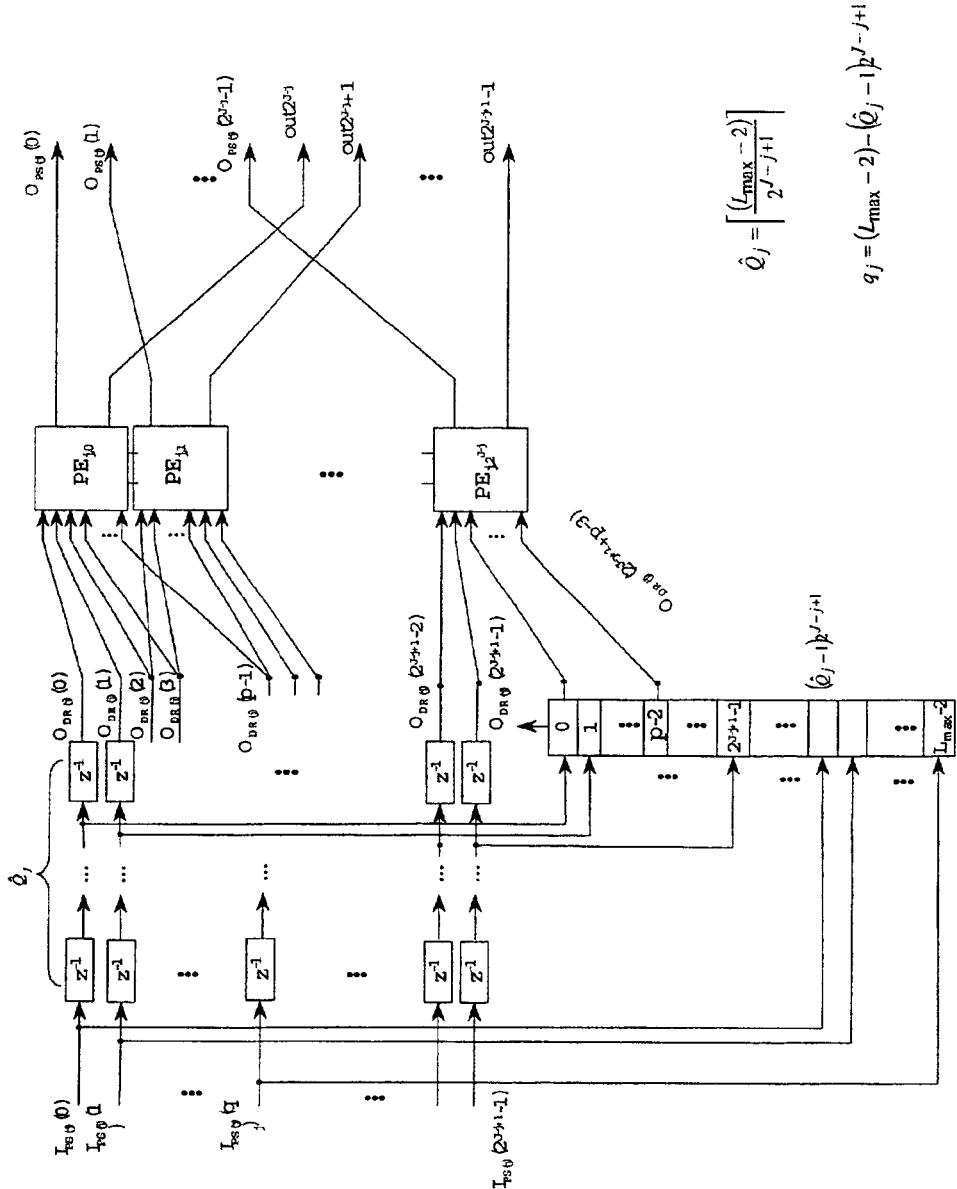
Figure 9. A realization of the $j$th pipeline stage, $j=1,...,J$, of the Type 2 core DWT architecture

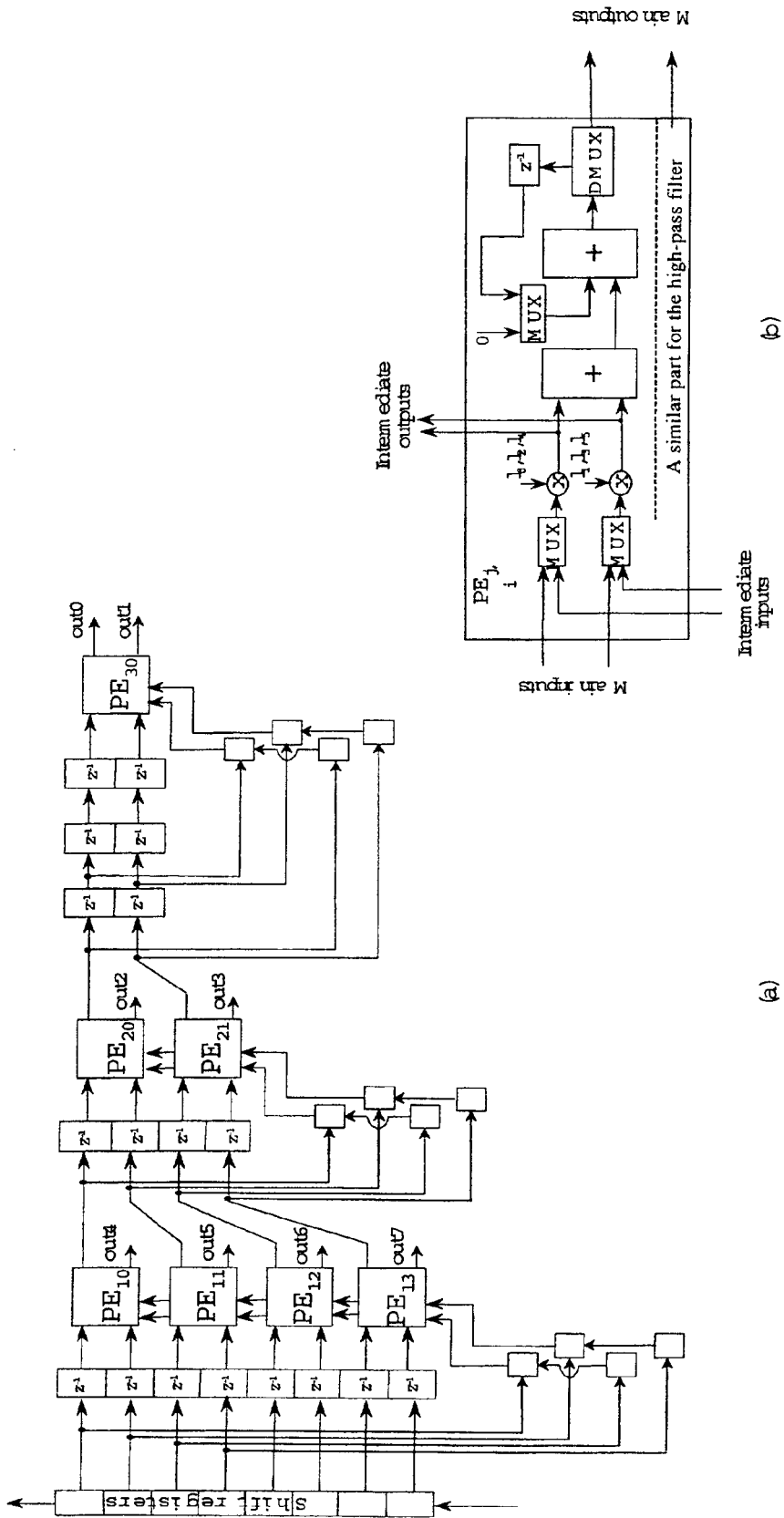
Figure 10. An example of realization of the Type 2 core DWT architecture for the case $L_{max}=6$; $J=3$; $p=2$; $N=2^m$, $m=3,4,...$ :
(a) the general structure; (b) a possible structure for the PEs.

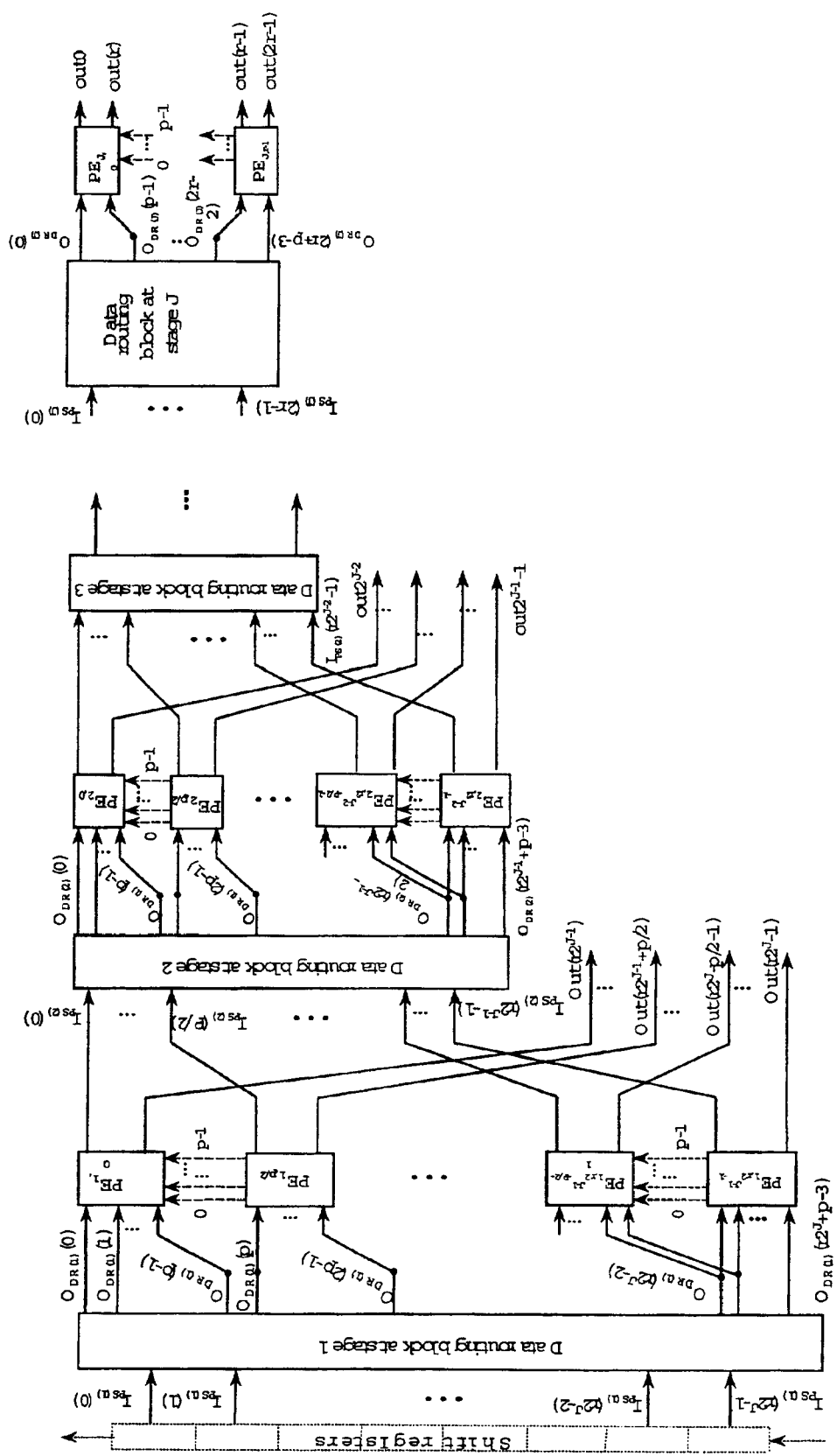
Figure 11. The general structure of multi-core DWT architectures

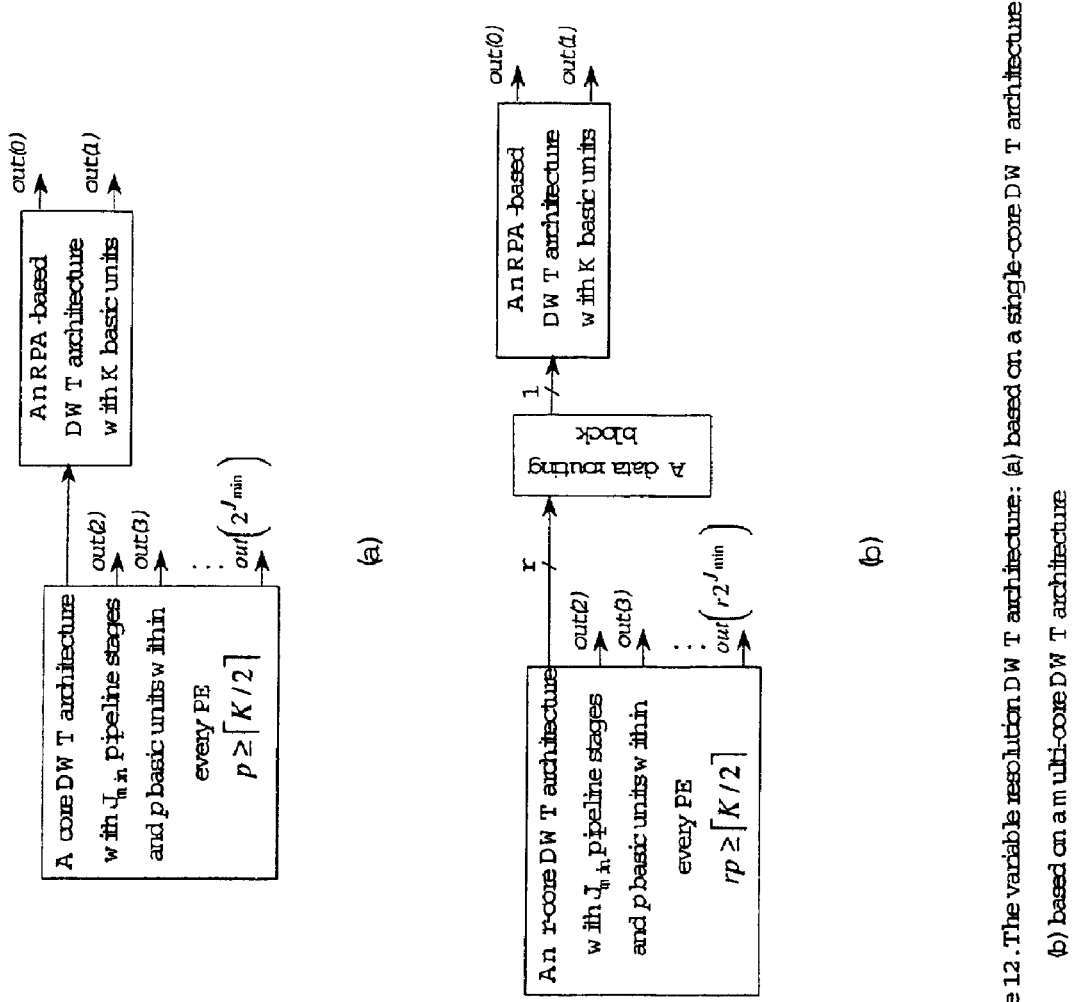
Figure 12. The variable resolution DWT architecture: (a) based on a single-core DWT architecture; (b) based on a multi-core DWT architecture

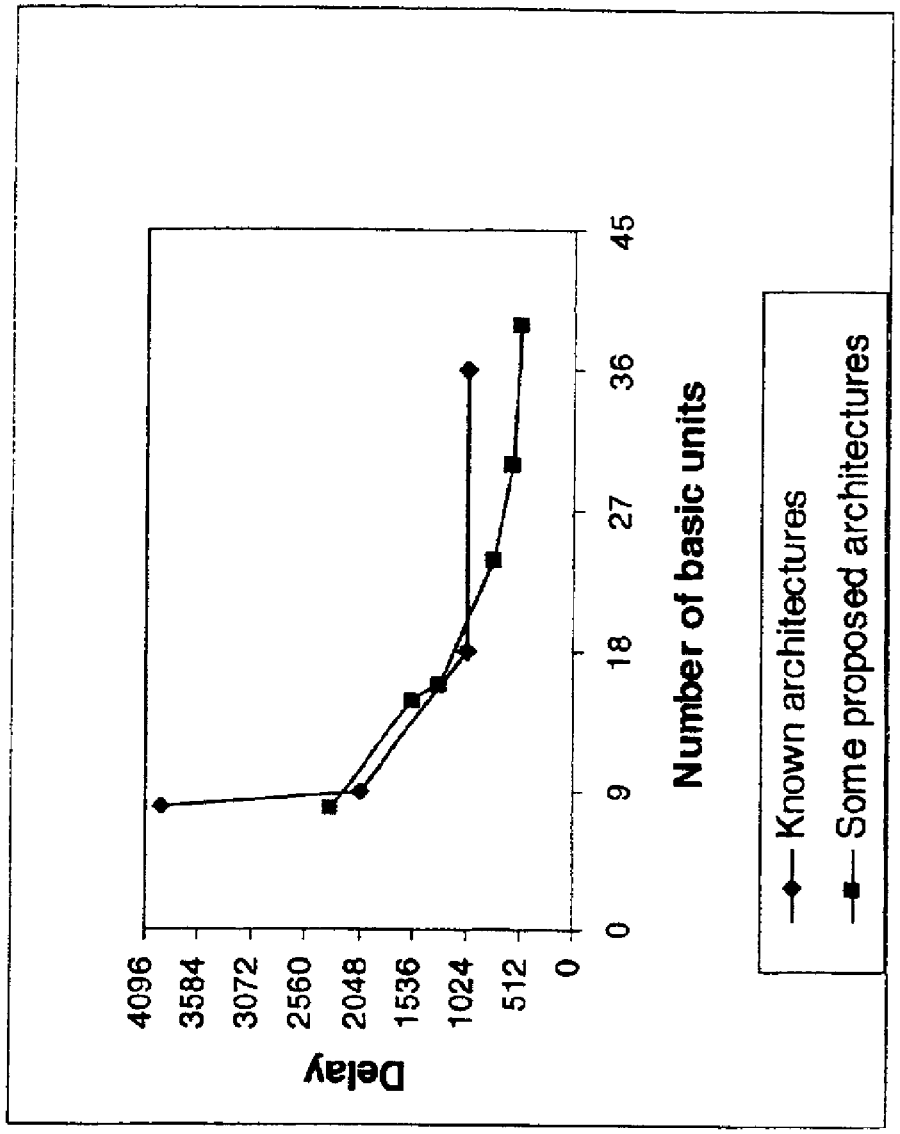
Figure 13. Delay versus number of basic units for some known and proposed DWT architectures (DWT parameters are: $N=1024, J=3, L=9$).

Figure 14.

Table 1. Comparative performance of some DWT architectures

| Architecture | Area, A (number of BUs) | Period, $T_p$ | $AT_p^2$ |
|---|---|---|---|
| TMS320C64x [36] | $\approx 2$ (64-bit) | $4N(1-2^{-J})+25J$ | $\approx 32\left((1-2^{-J})N+6J\right)^2$ |
| Architectures in [14], [15] | $L$ | $2N$ | $4N^2L$ |
| Architectures in [14]-[19] | $2L$ | $N$ | $2N^2L$ |
| Architectures in [12],[24] | $JL$ | $N$ | $JN^2L$ |
| Architectures of [30] | $4L$ or $\sum_{j=1}^{J}\lceil L/2^{j-2}\rceil$ | $N/2$ | $\approx N^2L$ |
| FPP DWT [34] (pipelined) | $2NL(1-1/2^J)$ | 1 (per vector) | $2NL(1-1/2^J)$ |
| LPP DWT [34] | $2L(2^J-1)$ | $N/2^J$ | $N^2L(2^J-1)/2^{2J-1}$ $\approx N^2L/2^{J-1}$ |
| Single-core DWT (Type 1 or 2) | $2p(2^J-1)$ | $N\lceil L/p\rceil/2^J$ | $\approx N^2p\lceil L/p\rceil^2/2^{J-1}$ |
| Single-core DWT, $p=1$ | $2(2^J-1)$ | $NL/2^J$ | $\approx N^2L^2/2^J$ |
| Single-core DWT $p=L_{max}$ ($L\le L_{max}$) | $2L_{max}(2^J-1)$ | $N/2^J$ | $\approx N^2L_{max}/2^{J-1}$ |
| Multi-core DWT | $2pr(2^J-1)$ | $(N\lceil L/p\rceil)/(r2^J)$ | $\approx (N^2p\lceil L/p\rceil^2)/(r2^{J-1})$ |
| Multi-core DWT, $r=4$, $p=1$ | $8(2^J-1)$ | $NL/2^{J+2}$ | $\approx N^2L^2/2^{J+1}$ |
| Multi-core DWT $r=4$, $p=L_{max}$ ($L\le L_{max}$) | $2rL_{max}(2^J-1)$ | $N/(r2^J)$ | $\approx (N^2L_{max})/(r2^{J-1})$ |
| Variable resolution single-core DWT $p\ge\lceil K/2\rceil$ ($K\le 2L$) | $2p(2^{J_{min}}-1)+K$ $\approx K2^{J_{min}}$ | $N\lceil 2L/K\rceil/2^{J_{min}}$ $\approx 2NL/(K2^{J_{min}})$ | $\approx \dfrac{N^2L^2}{K2^{J_{min}-2}}$ |

Figure 15.
Table 2. Numerical examples from Table 1 ($N=1024$, $L=9$, $J=3$ and $J=4$)

| Architecture | Number of BUs (gate count) | | Period, $T_p$ (in cc's) | |
|---|---|---|---|---|
| | $J=3$ | $J=4$ | $J=3$ | $J=4$ |
| TMS320C64x | 2 64-bit | 2 64-bit | | 3940 |
| Non-pipelined, [14], [15] | 9 (17226) | 9 (17226) | 2048 | 2048 |
| Two-stage pipelined, [14]- [19] | 18 (34452) | 18 (34452) | 1024 | 1024 |
| J-stage pipelined, [12], [24] | 27 (51678) | 36 (68904) | 1024 | 1024 |
| J-stage pipelined, [30] | 36 (68904) | 36 (68904) | 512 | 512 |
| FPP DWT (pipelined), [34] | 16128 ($3.08 \cdot 10^8$) | 17280 ($3.3 \cdot 10^8$) | 1 | 1 |
| LPP DWT (pipelined), [34] | 126 (241164) | 270 (516780) | 64 | 32 |
| Single-core DWT, $p=1$ | 14 (26796) | 30 (57420) | 1152 | 576 |
| Single-core DWT, $p=Lmax=10$ | 140 (267960) | 300 (574200) | 128 | 64 |
| Multi-core DWT, $r=4$, $p=1$ | 56 (107184) | 120 (229680) | 288 | 144 |
| Multi-core DWT, $r=4$, $p=Lmax=10$ | 560 (107184) | 1200 (229680) | 32 | 16 |
| Variable resolution single-core DWT, $p=1$, $(K=2)$, $J_{min}=2$ | 8 (15312) | 8 (15312) | 2304 | 2304 |
| Variable resolution single-core DWT, $p=2$, $(K=3/K=4)$, $J_{min}=2$ | 15 (28710) | 15 (28710) | 1536 | 1536 |
| | 16 (30624 | 16 (30624 | 1280 | 1280 |
| Variable resolution single-core DWT, $p=3$, $(K=6)$, $J_{min}=2$ | 24 (45936) | 24 (45936) | 768 | 768 |
| Variable resolution single-core DWT, $p=5$, $(K=9)$, $J_{min}=2$ | 39 (74646) | 39 (74646) | 512 | 512 |

Figure 16.
Table 3. Numerical examples from Table 1 ($N=1024$, $L=5$, $J=3$ and $J=4$)

| Architecture | Number of BUs (gate count) | | Period, Tp (in cc's) | |
|---|---|---|---|---|
| | $J=3$ | $J=4$ | $J=3$ | $J=4$ |
| TMS320C64x | 2 64-bit | 2 64-bit | | 3940 |
| Non-pipelined, [14], [15] | 5 (9570) | 5 (9570) | 2048 | 2048 |
| Two-stage pipelined, [14]- [19] | 10 (19140) | 10 (19140) | 1024 | 1024 |
| J-stage pipelined, [12], [24] | 15 (28710) | 20 (38280) | 1024 | 1024 |
| J-stage pipelined, [30] | 20 (38280) or 15 (28710) | 20 (38280) or 18 (34452) | 512 | 512 |
| FPP DWT (pipelined), [34] | 8960 ($1.7 \cdot 10^8$) | 9600 ($1.8 \cdot 10^8$) | 1 | 1 |
| LPP DWT (pipelined), [34] | 70 (133980) | 150 (287100) | 128 | 64 |
| Single-core DWT, $p=1$ | 14 (26796) | 30 (57420) | 640 | 320 |
| Single-core DWT, $p=L_{max}=5$ | 70 (133980) | 150 (287100) | 128 | 64 |
| Multi-core DWT, $r=4$, $p=1$ | 56 (107184) | 120 (229680) | 160 | 80 |
| Multi-core DWT, $r=4$, $p=L_{max}=5$ | 280 (535920) | 600 (1148400) | 32 | 16 |
| Variable resolution single-core DWT, $p=1$, $(K=2)$, $J_{min}=2$ | 8 (15312) | 8 (15312) | 1280 | 1280 |

ARCHITECTURES FOR DISCRETE WAVELET TRANSFORMS

BACKGROUND OF THE INVENTION

The invention relates to architectures for implementing discrete wavelet transforms (DWTs). The invention relates to any field where DWTs may be in use which is particularly but not exclusively concerned with architectures used in the fields of digital signal and image processing, data compression, multimedia, and communications.

A list of documents is given at the end of this description. These documents are referred to in the following by their corresponding numeral in square brackets.

The Discrete Wavelet Transform (DWT) [1]–[4] is a mathematical technique that decomposes an input signal of length $N=r\times k^m$ in the time domain by using dilated/contracted and translated versions of a single basis function, named the prototype wavelet. In one particular case $N=2^m$. DWTs can be performed using Haar wavelets, Hadamard wavelets and wavelet packets. Decomposition by Haar wavelets involves low-pass and high-pass filtering followed by downsampling by two of both resultant bands and repeated decomposition of the low-frequency band to J levels or octaves.

In the last decade, the DWT has often been found preferable to other traditional signal processing techniques since it offers useful features such as inherent scalability, computational complexity of O(N) (where N is the length of the processed sequence), low aliasing distortion for signal processing applications, and adaptive time-frequency windows. Hence, the DWT has been studied and applied to a wide range of applications including numerical analysis [5]–[6], biomedicine [7], image and video processing [1], [8]–[9], signal processing techniques [10] and speech compression/decompression [11]. DWT based compression methods have become the basis of such international standards as JPEG 2000 and MPEG-4.

In many of these applications, real-time processing is required in order to achieve useful results. Even though DWTs possess linear complexity, many applications cannot be handled by software solutions only. DWT implementations using digital signal processors (DSPs) improve computation speeds significantly, and are sufficient for some applications. However, in many applications software DWT implementations on general purpose processors or hardware implementations on DSPs such as TMS320C6x are too slow. Therefore, the implementation of the DWT by means of dedicated very large scale integrated (VLSI) Application Specific Integrate Circuits (ASICs) has recently captivated the attention of a number of researchers, and a number of DWT architectures have been proposed [12]–[24]. Some of these devices have been targetted to have a low hardware complexity. However, they require at least 2N clock cycles (cc's) to compute the DWT of a sequence having N samples. Nevertheless, devices have been designed having a period of approximately N cc's (e.g., the three architectures in [14] when they are provided with a doubled hardware, the architecture A1 in [15], the architectures in [16]–[18], the parallel filter in [19], etc.). Most of these architectures use the Recursive Pyramid Algorithm (RPA) [26], or similar scheduling techniques, in order both to reduce memory requirement and to employ only one or two filter units, independently from the number of decomposition levels (octaves) to be computed. This is done producing each output at the "earliest" instance that it can be produced [26].

Architectures [17], [18] consist of only two pipeline stages where the first pipeline stage implements the first DWT octave and the second stage implements all of the following octaves based on the RPA. Even though the architectures of [17] and [18] operate at approximately 100% hardware utilisation for a large enough number of DWT octaves, they have complex control and/or memory requirements. Furthermore because they employ only two pipelining stages they have relatively low speeds. The highest throughput achieved in conventional architectures is $N=2^m$ clock cycles for implementing a $2^m$-point DWT. Approximately 100% hardware utilisation and higher throughput is achieved in previously proposed architectures [31], [32].

The demand for low power VLSI circuits in modern mobile/visual communication systems is increasing. Improvements in the VLSI technology have considerably reduced the cost of the hardware. Therefore, it is often worthwhile reducing the period, even at the cost of increasing the amount of hardware. One reason is that low-period devices consume less power. For instance, a device D having a period T=N/2 cc's can be employed to perform processing which is twice as fast as a device D' having a period T'=N cc's. Alternatively, if the device D is clocked at a frequency f then it can achieve the same performance as the device D' clocked at a frequency f'=2f. Therefore, for the device D the supply voltage (linear with respect to f) and the power dissipation (linear with respect to $f^2$) can be reduced by factors of 2 and 4 respectively with respect to the supply voltage of the device D' [27].

High throughput architectures typically make use of pipelining or parallelism in which the DWT octaves are implemented with a pipeline consisting of similar hardware units (pipeline stages). Even though pipelining has been already exploited by existing DWT architectures (e.g., those in [12], [23]–[24]), the fastest pipelined designs need at least N time units to implement an N-point DWT.

Most of the known designs for implementation of DWTs are based on the tree-structured filter bank representation of DWT shown in FIG. 1 where there are several (J) stages (or octaves) of signal decomposition each followed by downsampling by a factor of two. As a consequence of downsampling, the amount of data input to each subsequent decomposition stage is half the amount input to the immediately previous decomposition stage. This makes the hardware of decomposition stages in a typical pipelined device designed to implement DWT using the tree-structured approach heavily under-utilised, since the stage implementing the octave j=1, . . . , J is usually clocked at a frequency $2^{j-1}$ times lower than the clock frequency used in the first octave [24]. This under-utilisation comes from a poor balancing of the pipeline stages when they implement the DWT octaves and leads to a low efficiency.

In [30] a pipeline architecture has been proposed based on the tree-structured filter bank representation which achievies approximately 100% hardware utilisation and throughput of $N/2=2^{m-1}$ clock cycles for a $2^m$-point DWT. This involves a J-stage pipeline using, as far as it is possible, half as many processing units from one stage to the next stage.

Known parallel or pipelined architectures essentially depend on DWT parameters such as input length, the number of octaves, the length and, in some cases, the actual coefficient values of the low-pass and high-pass filters. For larger values of these parameters, these architectures can be very large. Furthermore, it is only possible to implement a DWT with fixed parameters within a given hardware realization of a given architecture. However, in JPEG 2000, a DWT is separately applied to tiles of an image, in which the sizes of the tiles may vary from one to $2^{32}-1$. The number of octaves of decomposition may vary from 0 to 255 for different tiles. Thus it is desirable to have a device capable of implementing DWTs with varying parameters or, in other words, a unified device that is relatively independent of the DWT parameters. Designing such a device is straightforward in the case of serial architectures. It is not so straightforward in the case of parallel or pipelined architectures.

Most of the conventional architectures [12]–[26] employ a number of multipliers and adders proportional to the length of the DWT filters. Even though some architectures [17], [18] are able of implementing DWTs with varying number of octaves, their efficiency decreases rapidly as the number of octaves increases.

SUMMARY OF THE INVENTION

According to the aspects of the invention, the present invention is directed to a microprocessor structure for performing a discrete wavelet transform operation. In one embodiment, the discrete wavelet transform operation comprises decomposition of an input signal vector comprising a number of input samples, over a specified number of decomposition levels j, where j is an integer in the range 1 to J, starting from a first decomposition level and progressing to a final decomposition level. The microprocessor structure has a number of processing stages, each of the stages corresponding to a decomposition level j of the discrete wavelet transform and being implemented by a number of basic processing elements. The number of basic processing elements implemented in each of the processing stages decreases by a constant factor at each increasing decomposition level j.

These are generally scalable structures which are based on flowgraph representation of DWTs.

In this invention, general parametric structures of two types of DWT architectures, referred to as Type 1 and Type 2 core DWT architectures are introduced, as well as general parametric structures of two other DWT architectures which are constructed based on either a core DWT architecture and are referred to as the multi-core DWT architecture and the variable resolution DWT architecture, respectively. All the architectures can be implemented with a varying levels of parallelism thus allowing a trade-off between the speed and hardware complexity. In this invention advantages of both parallel and pipelined processing are combined in order to develop DWT architectures with improved efficiency (hardware utilisation) and, consequently, with improved throughput or power consumption. General structures of several DWT architectures operating at approximately 100% hardware utilisation at every level of parallelism are proposed. The architectures presented are relatively independent of the size of the input signal, the length of the DWT filters, and in the case of a variable resolution DWT architecture also on the number of octaves. The architectures can be implemented with varying levels of parallelism providing an opportunity to determine the amount of hardware recources required in a particular application and to trade-off between speed, cost, chip area and power consumption requirements. In addition, the architectures demonstrate excellent area-time characteristics compared to the existing DWT designs. The invention provides architectures which are regular and easily controlled, which do not contain feedback, long (depending on the length of the input) connections or switches. They can be implemented as semi-systolic arrays.

BRIEF DESCRIPTION OF THE DRAWINGS

Embodiments of the invention will now be described, by way of example only, with reference to the accompanying drawings in which:

FIG. 1 shows the tree-structured definition/representation of DWTs on which most of the known DWT architectures are based;

FIG. 2 shows an example of a new flowgraph representation of DWTs on which the architectures proposed in this invention are based;

FIG. 3 shows an embodiment of a compact form flowgraph representation of DWTs;

FIG. 4 shows the general architecture of two types of core DWT architectures according to the invention;

FIG. 5 shows a possible embodiment of one stage of the Type 1 architecture of FIG. 4;

FIG. 6 shows an embodiment of the Type 1 core DWT architecture embodiment of FIG. 5 corresponding to the parameters: $p=L_{max}=6$; $J=3$; $N=2^m$, $m=3,4,\ldots$;

FIG. 7 shows another embodiment of the Type 1 Core DWT architecture embodiment of FIG. 5 corresponding to the parameters: $p=L_{max}=6$; $J=3$; $N=2^m$, $m=3,4,\ldots$;

FIG. 8 shows four possible embodiments of PEs that can be used in the Type 1 core DWT architecture of FIG. 4;

FIG. 9 shows a possible embodiment of one stage of the Type 2 core DWT architecture of FIG. 4;

FIG. 10 shows an embodiment of the possible realisation of the Type 2 core DWT architecture;

FIG. 11 shows the general architecture of the multi-core DWT architecture according to the invention;

FIG. 12 shows the general architecture of the variable resolution DWT architecture according to the invention;

FIG. 13 shows a plot of the delay versus number of BUs for known architectures and DWT architectures according to the invention;

FIG. 14 shows Table 1;

FIG. 15 shows Table 2; and

FIG. 16 shows Table 3.

DETAILED DESCRIPTION OF THE PREFERRED EMBODIMENTS

To describe architectures proposed in this invention we first need to define the DWT and to present the basic algorithm that is implemented within the architectures. There are several alternative definitions/representations of DWTs such as the tree-structured filter bank, the lattice structure, lifting scheme or matrix representation. The following discussion uses the matrix definition and a flowgraph representation of DWTs which is very effective in designing efficient parallel/pipelined DWT architectures.

A discrete wavelet transform is a linear transform $y=H \cdot x$, where $x=[x_0,\ldots,x_{N-1}]^T$ and $y=[y_0,\ldots,y_{N-1}]^T$ are the input and the output vectors of length $N=2^m$, respectively, and H is the DWT matrix of order N×N which is formed as the product of sparse matrices:

$$H=H^{(J)}H^{(J-1)} \cdot \ldots \cdot H^{(1)}, \quad 1 \leq J \leq m;$$

$$H^{(j)} = \begin{pmatrix} D_j & 0 \\ 0 & I_{2^m-2^{m-j+1}} \end{pmatrix}, \quad j=1,\ldots,m \qquad (1)$$

where $I_k$ is the identity (k×k) matrix ($k=2^m-2^{m-j+1}$), and $D_j$ is the analysis ($2^{m-j+1} \times 2^{m-j+1}$) matrix at stage j having the following structure:

$$D_j = \begin{pmatrix} l_1 & l_2 & \ldots & l_L & 0 & 0 & \ldots & 0 \\ 0 & 0 & l_1 & l_2 & \ldots & l_L & \ldots & 0 \\ & & & \circ & & & & \\ l_3 & \ldots & l_L & 0 & 0 & \ldots & l_1 & l_2 \\ h_1 & h_2 & \ldots & h_L & 0 & 0 & \ldots & 0 \\ 0 & 0 & h_1 & h_2 & \ldots & h_L & \ldots & 0 \\ & & & \circ & & & & \\ h_3 & \ldots & h_L & 0 & 0 & \ldots & h_1 & h_2 \end{pmatrix} \quad (2)$$

$$= P_j \cdot \begin{pmatrix} l_1 & l_2 & \ldots & l_L & 0 & 0 & \ldots & 0 \\ h_1 & h_2 & \ldots & h_L & 0 & 0 & \ldots & 0 \\ 0 & 0 & l_1 & l_2 & \ldots & l_L & \ldots & 0 \\ 0 & 0 & h_1 & h_2 & \ldots & h_L & \ldots & 0 \\ & & & \circ & & & & \\ l_3 & \ldots & l_L & 0 & 0 & \ldots & l_1 & l_2 \\ h_3 & \ldots & h_L & 0 & 0 & \ldots & h_1 & h_2 \end{pmatrix}$$

where $LP=[l_1, \ldots, l_L]$ and $HP=[h_1, \ldots, h_L]$ are the vectors of coefficients of the low-pass and of the high-pass filters, respectively (L being the length of the filters), and $P_j$ is the matrix of the perfect unshuffle operator (see [31]) of the size ($2^{m-j+1} \times 2^{m-j+1}$). For the sake of clarity both filters are assumed to have the same length which is an even number. The result may be readily expanded to the general case of arbitrary filter lengths. In the general case (that is where $N = r \times k^m$ rather than $N = 2^m$), where k is not equal to two (that is there are other than two filtering operations carried out in each PE and there are other than two outputs from each PE), a suitable stride permutation rather than the unshuffle operation is applied.

Adopting the representation (1)–(2), the DWT is computed in J stages (also called decomposition levels or octaves), where the jth stage, $j=1, \ldots, J$, constitutes multiplication of a sparse matrix $H^{(j)}$ by a current vector of scratch variables, the first such vector being the input vector x. Noting that lower right corner of every matrix $H^{(j)}$ is an identity matrix and taking into account the structure of the matrix $D_j$, the corresponding algorithm can be written as the following pseudocode where $x_{LP}^{(j)} = [x_{LP}^{(j)}(0), \ldots, x_{LP}^{(j)}(2^{m-j}-1)]^T$, and $x_{HP}^{(j)} = [x_{HP}^{(j)}(0), \ldots, x_{HP}^{(j)}(2^{m-j}-1)]^T$, $j=1, \ldots, J$, are ($2^{m-j} \times 1$) vectors of scratch variables, and the notation $[(x_1)^T, \ldots, (x_k)^T]^T$ stands for concatenation of column vectors $x_1, \ldots, x_k$.

---

Algorithm 1.

1. Set $x_{LP}^{(0)} = [x_{LP}^{(0)}(0), \ldots, x_{LP}^{(0)}(2^m-1)]^T = x$;
2. For $j = 1, \ldots, J$ compute $$x_{LP}^{(j)} = [x_{LP}^{(j)}(0), \ldots, x_{LP}^{(j)}(2^{m-j}-1)]^T \text{ and}$$

$$x_{HP}^{(j)} = [x_{HP}^{(j)}(0), \ldots, x_{HP}^{(j)}(2^{m-j}-1)]^T$$

where $$\left[(x_{LP}^{(j)})^T, (x_{HP}^{(j)})^T\right]^T = D_j \cdot x_{LP}^{(j-1)}, \quad (3)$$

or, equivalently,

2. For $i = 0, \ldots, 2^{m-j} - 1$,
  Begin
   Form the vector //* a subvector of length L of the vector $x_{LP}^{(j-1)}$ */

$$\tilde{x} = [x_{LP}^{(j-1)}(2i), x_{LP}^{(j-1)}(2i+1), x_{LP}^{(j-1)}((2i+2) \bmod 2^{m-j+1}), \ldots,$$

$$x_{LP}^{(j-1)}((2i+L-1) \bmod 2^{m-j+1}))]^T;$$

Compute

---

-continued

Algorithm 1.

$x_{LP}^{(J)}(i) = LP \cdot \tilde{x}; \quad x_{HP}^{(j)}(i) = HP \cdot \tilde{x};$
End
3. Form the output vector $y = [x_{LP}^{(J)}, x_{HP}^{(J)}, x_{HP}^{(J-1)}, \ldots, x_{HP}^{(2)}, x_{HP}^{(1)}]^T.$

---

Computation of Algorithm 1 with the matrices $D_j$ of (2) can be demonstrated using a flowgraph representation. An example for the case $N=2^3=8$, $L=4$, $J=3$ is shown in FIG. 2. The flowgraph consists of J stages, the j-th stage, $j=1, \ldots, J$, having $2^{m-j}$ nodes (depicted as boxes on FIG. 2). Each node represents a basic DWT operation (see FIG. 2(b)). The ith node, $i=0, \ldots, 2^{m-j}-1$, of stage $j=1, \ldots, J$ has incoming edges from L circularly consecutive nodes $2i, 2i+1$, $(2i+2) \bmod 2^{m-j+1} \ldots, (2i+L-1) \bmod 2^{m-j+1}$ of the preceding stage or (for the nodes of the first stage) from inputs. Every node has two outgoing edges. An upper (lower) outgoing edge represents the value of the inner product of the vector of low-pass (high-pass) filter coefficients with the vector of the values of incoming edges. Outgoing values of a stage are permuted according to the perfect unshuffle operator so that all the low-pass components (the values of upper outgoing edges) are collected in the first half and the high-pass components are collected at the second half of the permuted vector. Low pass components then form the input to the following stage or (for the nodes of the last stage) represent output values. High-pass components and the low pass components at that stage represent output values at a given resolution.

Essentially, the flowgraph representation provides an alternative definition of discrete wavelet transforms. It has several advantages, at least from the implementation point of view, as compared to the conventional DWT representations such as the tree-structured filter bank, lifting scheme or lattice structure representation.

However, the flowgraph representation of DWTs as it has been presented has a disadvantage of being very large for bigger values of N. This disadvantage can be overcome based on the following. Assuming $J < \log_2 N$ i.e. in the level of decomposition is<<number of points in the input vector (in most applications $J << \log_2 N$) one can see that the DWT flowgraph consists of $N/2^J$ similar patterns (see the two hatching regions on FIG. 2). Each pattern can be considered as a $2^J$-point DWT with a specific strategy of forming the input signals to each of its octaves. The $2^{m-j+1}$ input values of the j-th, $j=1, \ldots, J$, octave are divided within the original DWT (of length $N=2^m$) into $N/2^J = 2^{m-J}$ non-overlapping groups consisting of $2^{J-j+1}$ consecutive values. This is equivalent to dividing the vector $x_{LP}^{(j-1)}$ of (3) into subvectors $x^{(j-1,s)} = x_{LP}^{(j-1)}(s \cdot 2^{J-j+1}:(s+1) \cdot 2^{J-j+1}-1)$, $s=0, \ldots, 2^{m-J}-1$, where here and in the following the notation $x(a:b)$ stands for the subvector of x consisting of the a-th to b-th components of x. Then the input of the j-th, $j=1, \ldots, J$, octave within the s-th pattern is the subvector $\hat{x}^{(j-1,s)}(0:2^{J-j+1}+L-3)$ of the vector, $$\hat{x}^{(j-1,s)} = \left[\left(x_{LP}^{(j-1,s \bmod 2^{m-J})}\right)^T, \left(x_{LP}^{(j-1,(s+1) \bmod 2^{m-J})}\right)^T, \ldots, \left(x_{LP}^{(j-1,(s+Q_j) \bmod 2^{m-J})}\right)^T\right]^T \quad (4)$$

being the concatenation of the vector $x_{LP}^{(j-1,s)}$ with the circularly next $Q_j$ vectors where $Q_j = \lceil (L-2)/2^{J-j+1} \rceil$.

If the $2^{m-J}$ patterns are merged into a single pattern, a compact (or core) flowgraph representation of the DWT is obtained. An example of a DWT compact flowgraph representation for the case J=3, L=4 is shown in FIG. 3. The compact DWT flowgraph has $2^{J-j}$ nodes at its j-th stage, j=1, . . . , J, where a set of $2^{m-J}$ temporally distributed values are now assigned to every node. Every node has L incoming and two outgoing edges like in the ("non-compact") DWT flowgraph. Again incoming edges are from L "circularly consecutive" nodes of the previous stage but now every node represents a set of temporally distributed values. Namely, the L inputs of the ith node of the j-th, stage, j=1, . . . , J, for its sth value, s=0, . . . , $2^{m-J}-1$ are connected to the nodes (2i+n)mod $2^{J-j+1}$, n=0, . . . , L−1 of the (j−1)st stage which now represent their (s+s')th values where s'=$\lfloor (2i+n)/2^{J-j+1} \rfloor$. Also, outputs are now distributed over the outgoing edges of the compact flowgraph not only spatially but also temporally. That is, each outgoing edge corresponding to a high-pass filtering result of a node or low-pass filtering result of a node of the last stage represents a set of $2^{m-J}$ output values. Note that the structure of the compact DWT flowgraph does not depend on the length of the DWT but only on the number of decomposition levels and filter length. The DWT length is reflected only in the number of values represented by every node. It should also be noted that the compact flowgraph has the structure of a $2^J$-point DWT with slightly modified appending strategy. In fact, this appending strategy is often used in matrix formulation of the DWT definition.

Let $\hat{D}_j$ denote the main $(2^{J-j+1} \times (2^{J-j+1}+L-2))$-minor of $D_j$ (see (2)), j=1, . . . , J that is let $\hat{D}_j$ be a matrix consisting of the first $2^{J-j+1}$ rows and the first $2^{J-j+1}+L-2$ columns of $D_j$. For example, if J−j+1=2 and L=6, then $\hat{D}_j$ is of the form:

$$\hat{D}_j = \begin{pmatrix} l_1 & l_2 & l_3 & l_4 & l_5 & l_6 & 0 & 0 \\ 0 & 0 & l_1 & l_2 & l_3 & l_4 & l_5 & l_6 \\ h_1 & h_2 & h_3 & h_4 & h_5 & h_6 & 0 & 0 \\ 0 & 0 & h_1 & h_2 & h_3 & h_4 & h_5 & h_6 \end{pmatrix}$$

Adopting the notation of (4), the computational process represented by the compact flowgraph can be described with the following pseudocode.

---

Algorithm 2.

1. For s = 0, ... , $2^{m-J}-1$ set $x_{LP}^{(0,s)} = x(s \cdot 2^J:(s+1) \cdot 2^J - 1)$;
2. For j = 1, ... , J
   For s = 0, ... , $2^{m-J}-1$
   Begin
      2.1. Set $\hat{x}^{(j-1,s)}$ according to (4)
      2.2. Compute $\left[ \left(x_{LP}^{(j,s)}\right)^T, \left(x_{HP}^{(j,s)}\right)^T \right]^T = \hat{D}_j \cdot \hat{x}^{(j-1,s)}(0:2^{J-j+1}+L-3)$.
   End
1. Form the output vector
   $y = \left[ (x_{LP}^{(J,0)})^T, \ldots , \left(x_{LP}^{(J,2^{m-J}-1)}\right)^T, (x_{HP}^{(J,0)})^T, \ldots , \left(x_{HP}^{(J,2^{m-J}-1)}\right)^T, \ldots , \right.$
   $\left. (x_{HP}^{(1,0)})^T, \ldots , \left(x_{HP}^{(1,2^{m-J}-1)}\right)^T \right]^T$.

---

Implementing the cycle for s in parallel yields a parallel DWT realisation. On the other hand, by exchanging the nesting order of the cycles for j and s and implementing the (nested) cycle for j in parallel it is possible to implement a pipelined DWT realisation. However, both of these realisations would be inefficient since the number of operations is halved from one octave to the next. However, combining the two methods yields very efficient parallel-pipelined or partially parallel-pipelined realisations.

To apply pipelining to the Algorithm 2, retiming must be applied since computations for s include results of computations for s+1, . . . , s+$Q_j$−1 meaning that the jth octave, j=1, . . . , J, introduces a delay of $Q_j$ steps. Since the delays are accumulated, computations for the jth octave, j=1, . . . , J, must start with a delay of $$s^*(j) = \sum_{n=1}^{j} Q_n. \quad (5)$$

during the steps s=s*(j), . . . , $2^{m-J}$+s*(j)−1. Thus, computations take place starting from the step s=s*(1) until the step s=s*(J)+$2^{m-J}$−1. At steps s=s*(1), . . . , s*(2)−1 computations of only the first octave are implemented, at steps s=s*(2), . . . , s*(3)−1 only operations of the first two octaves are implemented, etc. Starting from step s=s*(J) until the step s=s*(1)+$2^{m-J}$−1 (provided s*(J)<s*(1)+$2^{m-J}$) computations of all the octaves j=1, . . . , J are implemented, but starting from step s=s*(1)+$2^{m-J}$ no computations for the first octave are implemented, starting from step s=s*(2)+$2^{m-J}$ no computations for the first two octaves are implemented, etc. In general, at step s=s*(1), . . . , $2^{m-J}$+s*(J)−1 computations for octaves j=$J_1$, . . . , $J_2$ are implemented where $J_1$=min {j such that s*(j)≤s<s*(j)+$2^{m-J}$} and $J_2$=max{j such that s*(j)≤s<s*(j)+$2^{m-J}$}. The following pseudocode presents the pipelined DWT realisation which is implemented within the architectures proposed in this invention.

---

Algorithm 3.

1. For s = 0, ... , $2^{m-J}-1$ set $x_{LP}^{(0,s)} = x(s \cdot 2^J:(s+1) \cdot 2^J - 1)$;
2. For s = s*(1), ... , $2^{m-J}$ + s*(J) − 1
   For j = $J_1$, ... , $J_2$ do in parallel
   Begin
      2.1. Set $\hat{x}^{(j-1,s-s^*(j))}$ according to (4)
      2.2. Compute
      $\left[ \left(x_{LP}^{(j,s-s^*(j))}\right)^T, \left(x_{HP}^{(j,s-s^*(j))}\right)^T \right]^T = \hat{D}_j \cdot \hat{x}^{(j-1,s-s^*(j))}(0:2^{J-j+1}+L-3)$.
   End
3. Form the output vector
   $y = \left[ (x_{LP}^{(J,0)})^T, \ldots , \left(x_{LP}^{(J,2^{m-J}-1)}\right)^T, (x_{HP}^{(J,0)})^T, \ldots , \left(x_{HP}^{(J,2^{m-J}-1)}\right)^T, \ldots , \right.$
   $\left. (x_{HP}^{(1,0)})^T, \ldots , \left(x_{HP}^{(1,2^{m-J}-1)}\right)^T \right]^T$.

---

In this invention, general parametric structures of two types of DWT architectures, referred to as Type 1 and Type 2 core DWT architectures are introduced, as well as general parametric structures of two other DWT architectures which are constructed based on either a core DWT architecture and are referred to as the multi-core DWT architecture and the variable resolution DWT architecture, respectively. All the architectures can be implemented with a varying level of parallelism thus allowing a trade-off between the speed and hardware complexity. Depending on the level of parallelism throughputs up to constant time implementation (one $2^m$-point DWT per time unit) may be achieved. At every level of parallelism the architectures operate with approximately 100% hardware utilisation thus achieving almost linear speed-up with respect to the level of parallelism compared with the serial DWT implementation. The architectures are relatively independent on the DWT parameters.

That is, a device having one of the proposed architectures would be capable of efficiently implementing not only one DWT but a range of different DWTs with different filter length and, in the case of variable resolution DWT architecture, with a different number of decomposition levels over vectors of arbitrary length.

Many different realisations of the proposed architectures are possible. Therefore, their general structures are described at a functional level. Realisations of the general structures at the register level are also presented. These realisations demonstrate the validity of the general structures. The proposed architectures are essentially different in terms of functional description level from known architectures.

The Type 1 and Type 2 core DWT architectures implement a $2^m$-point DWT with $J \leq m$ octaves based on low-pass and high pass filters of a length L not exceeding a given number $L_{max}$ where J and $L_{max}$ (but not m or L) are parameters of the realisation. Both Type 1 and Type 2 core DWT architectures comprise a serial or parallel data input block and J pipeline stages, the jth stage, $j=1, \ldots, J$, consisting of a data routing block and $2^{J-j}$ processing elements (PEs). This will be described in relation to FIG. 4. The jth pipeline stage, $j=1, \ldots, J$, of the architecture implements the $2^{m-j}$ independent similar operations of the jth DWT octave in $2^{m-J}$ operation steps. At every step, a group of $2^{J-j}$ operations is implemented in parallel within $2^{J-j}$ PEs of the pipeline stage. The PEs can be implemented with varying level of parallelism, which is specified by the number $p \leq L_{max}$ of its inputs. A single PE with p inputs implements one basic DWT operation (see FIG. 2,(b)) in one operation step consisting of $\lceil L/p \rceil$ time units where at every time unit the results of 2p multiplications and additions are obtained in parallel. Thus the time period (measured as the intervals between time units when successive input vectors enter to the architecture) is equal to $2^{m-J}\lceil L/p \rceil$ time units where the duration of the time unit is equal to the period of one multiplication operation. This is $2^J/\lceil L/p \rceil$ times faster than the best period of previously known architectures [12–26] and $2^{J-1}/\lceil L/p \rceil$ faster than the architectures described in [30]. The efficiency (or hardware utilisation) of both architectures is equal $L/(p\lceil L/p \rceil) \cdot 100\% \approx 100\%$. In the case of $p=L=L_{max}$ the period is $2^{m-J}$ time units which is the same as for the LPP architecture which, however, depends on the filter length L (i.e. the LPP architecture is only able to implement DWTs with filters of a fixed length L). The two types of core DWT architecture differ according to the absence (Type 1) or presence (Type 2) of interconnection between the PEs of one pipeline stage. Possible realisations of the two types of core DWT architectures are presented in FIGS. 5 to 10. The two types of core DWT architecture described above may be implemented with a varying degree of parallelism depending on the parameter p.

Further flexibility in the level of parallelism is achieved within multi-core DWT architectures by introducing a new parameter $r=1, \ldots, 2^{m-J}$. The multi-core DWT architecture is, in fact, obtained from corresponding (single-)core DWT architecture by expanding it r times. Its general structure is presented in FIG. 11. The architecture consists of a serial or parallel data input block and J pipeline stages, the jth pipeline stage, $j=1, \ldots, J$, consisting of a data routing block and $r2^{J-j}$ PEs. The time period of the multi-core DWT architecture is equal to $(2^{m-J}\lceil L/p \rceil)/r$ time units which is r times faster than that of single-core DWT architecture, i.e. a linear speed-up is provided. The efficiency of the multi-core DWT architecture is the same as for single-core DWT architectures, that is, approximately 100%. Note that in the case of $p=L=L_{max}$ and $r=2^{m-J}$ the period is just one time unit for a $2^m$-point DWT. Similar performance is achieved in the FPP architecture which can be considered as a special case ($p=L=L_{max}$ and $r=2^{m-J}$) of a possible realisation of the multi-core DWT architecture. EP/US]

The (single- and multi-)core DWT architectures are relatively independent of the length of the input and on the length of the filters, which means that DWTs based on arbitrary filters (having a length not exceeding $L_{max}$) over signals of arbitrary length can be efficiently implemented with the same device having either Type 1 or Type 2 core DWT architecture. However, these architectures are dependent on the number of DWT octaves J. They may implement DWTs with smaller than J number of octaves, though with some loss in hardware utilisation.

The variable resolution DWT architecture implements DWTs with arbitrary number of octaves J' and the efficiency of the architecture remains approximately 100% whenever J' is larger than or equal to a given number. The variable resolution DWT architecture comprises a core DWT architecture corresponding to $J_{min}$ decomposition levels and an arbitrary serial DWT architecture, for, instance, an RPA-based architecture (see FIG. 12,(a)). The core DWT architecture implements the first $J_{min}$ octaves of the J'-octave DWT and the serial DWT architecture implements the last $J'-J_{min}$ octaves of the J'-octave DWT. Since the core DWT architecture may be implemented with a varying level of parallelism it can be balanced with the serial DWT architecture in such a way that approximately 100% of hardware utilisation is achieved whenever $J' \geq J_{min}$.

A variable resolution DWT architecture based on a multi-core DWT architecture may also be constructed (see FIG. 12,(b)) in which a data routing block is inserted between the multi-core and serial DWT architectures.

The Proposed DWT Architectures

This section presents the general structures of two types of DWT architecture, referred to as Type 1 and Type 2 core DWT architectures, as well as two other DWT architectures which are constructed based on either core DWT architecture and are referred to as the multi-core DWT architecture and the variable resolution DWT architecture, respectively. The multi-core DWT architecture is an extension of either one of the core DWT architectures, which can be implemented with a varying level of parallelism depending on a parameter m, and in a particular case (m=1) it becomes the (single-)core DWT architecture. For ease of understanding the presentation of the architectures starts with a description of the (single-)core DWT architectures.

Both types of core DWT architecture implement an arbitrary discrete wavelet transform with J decomposition levels (octaves) based on low-pass and high-pass filters having a length L not exceeding a given number $L_{max}$. Their operation is based on Algorithm 3 presented earlier. The general structure representing both types of core DWT architecture is presented in FIG. 4, where dashed lines depict connections, which may or may not be present depending on the specific realisation. Connections are not present in Type 1 but are present in Type 2. In both cases the architecture consists of a data input block and J pipeline stages, each stage containing a data routing block and a block of processor elements (PEs) wherein the data input block implements the Step 1 of the Algorithm 3, data routing blocks are responsible for Step 2.1, and blocks of PEs are for computations of the Step 2.2. The two core architecture types mainly differ by the possibility of data exchange between PEs of the same pipeline stage. In the Type 2 core DWT architecture PEs of a single stage may exchange intermediate data via interconnections while in the Type 1 core DWT architecture there are no interconnections between the PEs within a pipeline stage and thus the PEs of a single stage do not exchange data during their operation.

In general many different realisations of data routing blocks and blocks of PEs are possible. Therefore, in one aspect, the invention can be seen to be the architectures as they are depicted at the block level (FIGS. 4, 11, and 12) and as they are described below at the functional level independent of the precise implementation chosen for the PEs and data routing blocks. However, some practical realisations of the proposed core DWT architectures at register level are presented by way of example with reference to FIGS. 5 to 10. These exemplary implementations demonstrate the validity of the invention.

FIG. 4 presents the general structure of the Type 1 and Type 2 core DWT architecture. As explained in the foregoing, Type 1 and Type 2 differ only in the lack or presence of interconnection between the Pes within a stage. The data input block of both core DWT architectures may be realized as either word-serial or word-parallel. In the former case the data input block consists of a single (word-serial) input port which is connected to a shift register of length $2^J$ (dashed lined box in FIG. 4) having a word-parallel output from each of its cells. In the latter case the data input block comprises $2^J$ parallel input ports. In both cases the data input block has $2^J$ parallel outputs which are connected to the $2^J$ inputs of the data routing block of the first pipeline stage. In FIG. 6 an example of a word-parallel data input block is presented while FIGS. 7 and 10 present an example of a word-serial data input block.

Type 1 Core DWT Architecture

The basic algorithm implemented within the Type 1 core DWT architecture is Algorithm 3 with a specific order of implementing Step 2.2. The structure of the $2^{J-j+1} \times 2^{J-j+1}$ matrix $\hat{D}_J$ is such that the matrix-vector multiplication of Step 2.2 can be decomposed into $2^{J-j}$ pairs of vector-vector inner product computations:

$$x^{(j,s-s^*(J))}(i) = LP \cdot \hat{x}^{(j-1,s-s^*(J))}(2i:2i+L-1),$$

$$x^{(j,s-s^*(J))}(i+2^{J-j}) = HP \cdot \hat{x}^{(j-1,s-s^*(J))}(2i:2i+L-1),$$

$$i=0, \ldots, 2^{J-j}-1$$

which can be implemented in parallel. On the other hand, every vector-vector inner product of length L can be decomposed into a sequence of $L_p = \lceil L/p \rceil$ inner products of length p with accumulation of the results (assuming that the coefficient vectors and input vectors are appended with appropriate number of zeros and are divided into subvectors of consecutive p components). As a result, Algorithm 3 can be presented with the following modification of the previous pseudocode.

---

Algorithm 3.1.

1. For $s = 0, \ldots, 2^{m-J} - 1$ set $x_{LP}^{(0,s)} = x(s \cdot 2^J : (s+1) \cdot 2^J - 1)$;
2. For $s = s^*(1), \ldots, 2^{m-J} + s^*(J) - 1$
     For $j = J_1, \ldots, J_2$ do in parallel
       Begin
       2.1. Set $\hat{x}^{(j-1,s-s^*(j))}$ according to (4)
       2.2. For $i = 0, \ldots, 2^{J-j} - 1$ do in parallel
         Begin
         Set $S_{LP}(i) = 0, S_{HP}(i) = 0$;
         For $n = 0, \ldots, L_p - 1$ do in sequential

---

Algorithm 3.1.

Begin $$S_{LP}(i) = S_{LP}(i) + \sum_{k=0}^{p-1} l_{np+k} \hat{x}^{(j-1,s-s^*(j))}(2i+np+k); \quad (6)$$

$$S_{HP}(i) = S_{HP}(i) + \sum_{k=0}^{p-1} h_{np+k} \hat{x}^{(j-1,s-s^*(j))}(2i+np+k); \quad (7)$$

End
        Set $x_{LP}^{(j,s-s^*(j))}(i) = S_{LP}(i); x_{HP}^{(j,s-s^*(j))}(i) = S_{HP}(i)$
      End
    End
3. Form the output vector $$y = \left[ (x_{LP}^{(J,0)})^T, \ldots, (x_{LP}^{(J,2^{m-J}-1)})^T, (x_{HP}^{(J,0)})^T, \ldots, (x_{HP}^{(J,2^{m-J}-1)})^T, \ldots, \right.$$

$$\left. (x_{HP}^{(1,0)})^T, \ldots, (x_{HP}^{(1,2^{m-J}-1)})^T \right]^T.$$

Note that given s and j, the group of operations (6) and (7) involve the subvector $\hat{x}^{(j-1,s-s^*(j))}(0:2^{J-j+1}+p-3)$ for n=0, the subvector $\hat{x}^{(j-1,s-s^*(j))}(p:2^{J-j+1}+2p-3)$ and, in general, the subvector $\hat{x}^{(j-1,sj,n)} = \hat{x}^{(j-1,s-s^*(j))}(np:2^{J-j+1}+(n+1)p-3)$ for $n=0, \ldots, L_p-1$. In other words, computations for $n=0, \ldots, L_p-1$ involve the first $2^{J-j+1}+p-2$ components of the vector $\hat{x}^{(j-1,sj,n)}$ which is obtained from the vector $\hat{x}^{(j-1,s-s^*(j))}$ by shifting its components left by np positions. It should also be noted that computations for a given $i=0, \ldots, 2^{J-j}-1$ always involve the components $2i, 2i+1, \ldots, 2i+p-1$ of the current vector $\hat{x}^{(j-1,sj,n)}$.

The general structure of the Type 1 core DWT architecture is presented in FIG. 4. In the case of this architecture, the dashed lines can be disregarded because there are no connections between PEs of a single stage. The architecture consists of a data input block (already described above) and J pipeline stages. In general, the jth pipeline stage, $j=1, \ldots, J$, of the Type 1 core DWT architecture comprises a data routing block having $2^{J-j+1}$ inputs $I_{PS(j)}(0), \ldots, I_{PS(j)}(2^{J-j+1}-1)$ forming the input to the stage, and $2^{J-j+1}+p-2$ outputs $O_{DRB(j)}(0), \ldots, O_{DRB(j)}(2^{J-j+1}+p-3)$ connected to the inputs of $2^{J-j}$ PEs. Every PE has p inputs and two outputs where $p \leq L_{max}$ is a parameter of the realisation describing the level of parallelism of every PE. Consecutive p outputs $O_{DRB(j)}(2i), O_{DRB(j)}(2i+1), \ldots, O_{DRB(j)}(2i+p-1)$ of the data routing block of the jth, $j=1, \ldots, J$, stage are connected to the p inputs of the ith, $i=0, \ldots, 2^{J-j}-1$, PE ($PE_{j,i}$) of the same stage. The first outputs of each of $2^{J-j}$ PEs of the jth pipeline stage, $j=1, \ldots, J-1$, form the outputs $O_{PS(j)}(0), \ldots, O_{PS(j)}(2^{J-j}-1)$ of that stage and are connected to the $2^{J-j}$ inputs $I_{PS(j+1)}(0), \ldots, I_{PS(j+1)}(2^{J-j}-1)$ of the data routing block of the next, (j+1)st, stage. The first output of the (one) PE of the last, Jth, stage is the 0th output out(0) of the architecture. The second outputs of the $2^{J-j}$ PEs of the jth pipeline stage, $j=1, \ldots, J$, form the $(2^{J-j})$th to $(2^{J-j+1}-1)$st outputs $out(2^{J-j}), \ldots, out(2^{J-j+1}-1)$ of the architecture.

The blocks of the Type 1 core DWT architecture are now described at the functional level. For convenience, a time unit is defined as the period for the PEs to complete one operation (which is equal to the period between successive groups of p data entering the PE) and an operation step of the architecture is defined as comprising $L_p$ time units.

The functionality of the data input block is clear from its structure. It serially or parallelly accepts and parallelly outputs a group of components of the input vector at the rate of $2^J$ components per operation step. Thus, the vector $x_{LP}^{(0,s)}$ is formed on the outputs of the data input block at the step $s=0, \ldots, 2^{m-J}-1$.

The data routing block (of the stage $j=1, \ldots, J$,) can, in general, be realized as an arbitrary circuitry which at the first time unit $n=0$ of its every operation step parallelly accepts a vector of $2^{J-j+1}$ components, and then at every time unit $n=0, \ldots, L_p-1$ of that operation step it parallelly outputs a vector of $2^{J-j+1}+p-2$ components $np, np+1, \ldots, (n+1)p+2^{J-j+1}-3$ of a vector being the concatenation (in chronological order) of the vectors accepted at previous $\hat{Q}_J$ steps, where $$\hat{Q}_J = \lceil (L_{max}-2)/2^{J-j+1} \rceil \; j=1, \ldots, J. \tag{8}$$

The functionality of the PEs used in the Type 1 core DWT architecture is to compute two inner products of the vector on its p inputs with two vectors of predetermined coefficients during every time unit and to accumulate the results of both inner products computed during one operation step. At the end of every operation step, the two accumulated results pass to the two outputs of the PE and new accumulation starts. Clearly, every PE implements the pair of operations (6) and (7) provided that the correct arguments are formed on their inputs.

It will now be demonstrated that the architecture implements computations according to Algorithm 3.1. In the case where $L<L_{max}$ an extra delay is introduced. The extra delay is a consequence of the flexibility of the architecture that enables it to implement DWTs with arbitrary filter length $L \leq L_{max}$. This should be compared with Algorithm 3.1 which presents computation of a DWT with a fixed filter length L. In fact, the architecture is designed for the filter length $L_{max}$ but also implements DWTs with shorter filters with a slightly increased time delay but without losing in time period.

Denote $$\hat{s}(0) = 0, \; \hat{s}(j) = \sum_{n=1}^{J} \hat{Q}_{n+j-1}, \; j = 1, \ldots, J. \tag{9}$$

During operation of the architecture, the vector $x_{LP}^{(0,s)}$ is formed on the outputs of the data input block at step $s=0, \ldots, 2^{m-J}-1$ and this enters to the inputs of the data routing block of the first pipeline stage. To show that the architecture implements computations according to Algorithm 3.1 it is sufficient to show that the vectors $x_{LP}^{(j,s-\hat{s}(j))}$ are formed at the first outputs of PEs of the jth stage (which are connected to the inputs of the (j+1)st stage) and the vectors $x_{HP}^{(j,s-\hat{s}(j))}$ are formed at their second outputs at steps $s=\hat{s}(j), \ldots, \hat{s}(j)+2^{m-J}-1$ provided that the vectors $x_{LP}^{(j-1,s-\hat{s}(j-1))}$ enter to the jth stage at steps $s=\hat{s}(j-1)+2^{m-J}-1$ (proof by mathematical induction). Thus, it is assumed that the data routing block of stage $j=1, \ldots, J$, accepts vectors $x_{LP}^{(j-1,s-\hat{s}(j-1))}$ at steps $s=\hat{s}(j-1), \ldots, \hat{s}(j-1)+2^{m-J}-1$. Then, according to the functional description of the data routing blocks, the components $np, np+1, \ldots, (n+1)p+2^{J-j+1}-3$ of the vector $$\tilde{x}^{(j-1,s-\hat{s}(j))} = \left[ \left( x_{LP}^{(j-1,s-\hat{s}(j+1) \bmod 2^{m-J})} \right)^T, \tag{10}$$

$$\left( x_{LP}^{(j-1,s-\hat{s}(j-1)+2) \bmod 2^{m-J})} \right)^T, \ldots,$$

-continued $$\left( x_{LP}^{(j-1,s-\hat{s}(j-1)) \bmod 2^{m-J})} \right)^T \right]^T$$

being the concatenation of the vectors accepted at steps $s-\hat{Q}_j, s-\hat{Q}_j+2, \ldots, s$, respectively, will be formed on the outputs of the data routing block at the time unit $n=0, \ldots, L_p-1$ of every step $s=\hat{s}(j), \ldots, \hat{s}(j)+2^{m-J}-1$. Since $\hat{s}(j) \geq s^*(j)$ (compare (3) and (9)), the vector $\hat{x}^{(j-1,s-\hat{s}(j))}$ (defined according to (4)) is the subvector of $\tilde{x}^{(j-1,s-\hat{s}(j))}$ so that their first $2^{J-j+1}+L-3$ components are exactly the same. Thus the vector $\hat{x}^{(j-1,sj,n)} = \hat{x}^{(j-1,s-\hat{s}(j))}(np:2^{J-j+1}+(n+1)p-3)$ is formed at the time unit $n=0, \ldots, L_p-1$ of the step $s=\hat{s}(j), \ldots, \hat{s}(j)+2^{m-J}-1$ at the outputs of the data routing block of stage $j=1, \ldots, J$. Due to the connections between the data routing block and PEs, the components $2i, 2i+1, \ldots, 2i+p-1$ of the vector $\hat{x}^{(j-1,sj,n)}$ which are, in fact, arguments of the operations (6) and (7), will be formed on the inputs of the $PE_{j,i}$, $i=0, \ldots, 2^{J-j}-1$ at the time unit $n=0, \ldots, L_p-1$ of the step $s=\hat{s}(j), \ldots, \hat{s}(j)+2^{m-J}-1$. Thus, if PEs implement their operations with corresponding coefficients, the vector $x_{LP}^{(j,s-\hat{s}(j))}$ will be formed on the first outputs of the PEs and the vector $x_{HP}^{(j,s-\hat{s}(j))}$ will be formed on their second outputs after the step $s=\hat{s}(j), \ldots, \hat{s}(j)+2^{m-J}-1$. Since the first outputs of PEs are connected to the inputs of the next pipeline stage this proves that the architecture implements computations according to the Algorithm 3.1 albeit with different timing (replace $s^*(j)$ with $\hat{s}(j)$ everywhere in Algorithm 3.1).

From the above considerations it is clear that a $2^m$-point DWT is implemented with the Type 1 core DWT architecture in $2^{m-J}+\hat{s}(J)$ steps each consisting of $L_p$ time units. Thus the delay between input and corresponding output vectors is equal to $$T_d(C1) = (2^{m-J}+\hat{s}(J))[L/p] \tag{11}$$

time units. Clearly the architecture can implement DWTs of a stream of input vectors. It is therefore apparent that the throughput or the time period (measured as the the intervals between time units when successive input vectors enter the architecture) is equal to $$T_p(C1) = 2^{m-J}[L/p] \tag{12}$$

time units.

Performance of parallel/pipelined architectures is often evaluated with respect to hardware utilization or efficiency, defined as $$E = \frac{T(1)}{K \cdot T(K)} \cdot 100\% \tag{13}$$

where T(1) is the time of implementation of an algorithm with one PE and T(K) is the time of implementation of the same algorithm with an architecture comprising K PEs. It can be seen that $T(1) = (2^m-1)[L/p]$ time units are required to implement a $2^m$-point DWT using one PE similar to the PEs used in the Type 1 core DWT architecture. Together with (11) and (12), and taking into account the fact that there are in total $K=2^J-1$ PEs within the Type 1 core DWT architecture, it can be shown that approximately 100% efficiency (hardware utilisation) is achieved for the architecture both with respect to time delay or, moreover, time period complexities. It should be noted that an efficiency close to the efficiency of the FPP architecture is reached only in a few pipelined DWT designs (see [17]) known from the prior art whereas most of the known pipelined DWT architectures reach much less than 100% average efficiency. It should also be noted that a time period of at least O(N) time units is required by known DWT architectures. The proposed architecture may be realized with a varying level of parallelism depending on the parameter P. As follows from (12) the time period complexity of the implementation varies between $T_L(C1)=2^{m-J}$ and $T_1(C1)=L2^{m-J}$. Thus the throughput of the architecture is $2^J/L$ to $2^J$ times faster than that of the fastest known architectures. The possibility of realising the architecture with a varying level of parallelism also gives an opportunity to trade-off time and hardware complexities. It should also be noted that the architecture is very regular and only requires simple control structures (essentially, only a clock) unlike, e.g. the architecture of [17]. It does not contain a feedback, switches, or long connections that depend on the size of the input, but only has connections which are at maximum only O(L) in length. Thus, it can be implemented as a semisystolic array.

A Possible Realisation of the Type 1 Core DWT Architecture

A possible structure of the jth pipeline stage, j=1, . . . , J, for the Type 1 core DWT architecture is depicted in FIG. 5. Two examples of such realisation for the case $L_{max}$=6, J=3 are shown in FIGS. 6 and 7, where p=$L_{max}$=6 and p=2, respectively. It should be noted that a particular case of this realisation corresponding to the case p=$L_{max}$ and, in particular, a slightly different version of the example on FIG. 6 has been presented which is referred to as a limited parallel-pipelined (LPP) architecture. It should be noted that the Type 1 core DWT architecture and its realisation in FIG. 5 are for the case of arbitrary p.

Referring to FIG. 5, it can be seen that in this realisation the data routing block consists of $\hat{Q}_j$ chain connected groups of $2^{J-j+1}$ delays each, and a shift register of length $2^{J-j+1}$+$L_{max}$−2 which shifts the values within its cells by p positions upwards every time unit. The $2^{J-j+1}$ inputs to the stage are connected in parallel to the first group of delays, the outputs of which are connected to the inputs of the next group of delays etc. Outputs of every group of delays are connected in parallel to the $2^{J-j+1}$ consecutive cells of the shift register. The outputs of the last $\hat{Q}_j$th group of delays are connected to the first $2^{J-j+1}$ cells, outputs of the $(\hat{Q}_j-1)$st group of delays are connected to the next $2^{J-j+1}$ cells, etc., with the exception that, the first $q_j=(L_{max}-2)-(\hat{Q}_J-1)2^{J-j+1}$ inputs of the stage are directly connected to the last $q_j$ cells of the shift register. The outputs of the first $2^{J-j+1}$+p−2 cells of the shift register form the output of the data routing block and are connected to the inputs of the PEs. In the case p=$L_{max}$ (see FIG. 6) no shift register is required but the outputs of the groups of delay elements and the first $q_j$ inputs of the stage are directly connected to the inputs of the PEs. On the other hand, in the case of p=2 (see FIG. 7) interconnections between the data routing block and the PEs are simplified since in this case there are only $2^{J-j+1}$ parallel connections from the first cells of the shift register to the inputs of the PEs. It will be apparent to one of ordinary skill in the art that the presented realization satisfies the functionality constraint for the data routing block of the Type 1 core DWT architecture. Indeed, at the beginning of every step, the shift register contains the concatenation of the vector of data accepted $\hat{Q}_j$ steps earlier with the vector of the first $L_{max}$−2 components from the next accepted vectors. Then during $L_p$ time units it shifts the components by p positions upwards every time.

Possible structures of PEs for the Type 1 core DWT architecture are presented in FIG. 8 for the case of arbitrary p, p=1, p=2, and p=$L_{max}$, (FIGS. 8,(a),(b),(c), and (d), respectively). Again it will be apparent to one of ordinary skill in the art that these structures implement the operations of (6) and (7) and, thus, satisfy the functionality description of the PEs. It should again be noted that these structures are suitable for a generic DWT implementation independent of the filter coefficients and PE structures optimized for specific filter coefficients can also be implemented.

Type 2 Core DWT Architecture

The Type 2 core DWT architecture implements a slightly modified version of the Algorithm 3.1. The modification is based on the observation that operands of operations (6) and (7) are the same for pairs $(i_1,n_1)$ and $(i_2,n_2)$ of indices i and n such that $2i_1+n_1p=2i_2+n_2p$. Assuming an even p (the odd case is treated similarly but requires more notation for its representation), this means that, when implementing the operations of (6) and (7), the multiplicands required for use in time unit n=1, . . . , $L_p$−1 within branch i=0, . . . , $2^{J-j}$−p/2−1 can obtained from the multiplicands obtained at step n−1 within branch i+p/2. The corresponding computational process is described with the following pseudocode where we denote $$l'_k = \begin{cases} l_k \text{ for } k = 0, \ldots, p-1 \\ l_k/l_{k-p}, \text{ for } k = p, \ldots, L-1 \end{cases};$$

$$h'_k = \begin{cases} h_k \text{ for } k = 0, \ldots, p-1 \\ h_k/l_{k-p}, \text{ for } k = p, \ldots, L-1 \end{cases}$$

---

Algorithm 3.2.

1. For s = 0, . . . , $2^{m-J}$ − 1 set $x_{LP}^{(0,s)}$ = x(s · $2^J$ :(s + 1) · $2^J$ − 1);
2. For s = s*(1), . . . , $2^{m-J}$ + s*(J) − 1
  For j = $J_1$, . . . , $J_2$ do in parallel
  Begin
    2.1. Set $\hat{x}^{(j-1,s-s^*(j))}$ according to (4)
    2.2. For i = 0, . . . , $2^{J-j}$ − 1 do in parallel
    Begin
      For k = 0, . . . , p − 1
      begin
        set $z_{LP}$(i, 0, k) = $l_k \hat{x}^{(j-1,s-s^*(j))}$(2i + k);
          $z_{HP}$(i, 0, k) = $h_k \hat{x}^{(j-1,s-s^*(j))}$(2i + k)

Compute $S_{LP}(i) = \sum_{k=0}^{p-1} z_{LP}(i, 0, k)$; $S_{HP}(i) = \sum_{k=0}^{p-1} z_{HP}(i, 0, k)$;

End
    For n = 1, . . . , $L_p$ − 1 do in sequential
    Begin
      For k = 0, . . . , p − 1
      Begin
        set $z_{LP}$(i, n, k) =
$$\begin{cases} l'_{np+k}z(i+p/2, n-1, k) \text{ if } i < 2^{J-j} - p/2 \\ l_{np+k}\hat{x}^{(j-1,s-s^*(j))}(2i+k) \text{ if } i \geq 2^{J-j} - p/2 \end{cases};$$
        set $z_{HP}$(i, n, k) =
$$\begin{cases} h'_{np+k}z(i+p/2, n-1, k) \text{ if } i < 2^{J-j} - p/2 \\ h_{np+k}\hat{x}^{(j-1,s-s^*(j))}(2i+k) \text{ if } i \geq 2^{J-j} - p/2 \end{cases}$$
      End
      Compute $$S_{LP}(i) = S_{LP}(i) + \sum_{k=0}^{p-1} z_{LP}(i, n, k);$$

$$S_{HP}(i) = S_{HP}(i) + \sum_{k=0}^{p-1} z_{HP}(i, n, k);$$

End
    Set $x_{LP}^{(j,s-s^*(j))}(i) = S_{LP}(i)$; $x_{HP}^{(j,s-s^*(j))}(i) = S_{HP}(i)$
  End
3. Form the output vector -continued Algorithm 3.2.

$$y = \left[(x_{LP}^{(J,0)})^T, \ldots, \left(x_{LP}^{(J,2^{m-J}-1)}\right)^T, (x_{HP}^{(J,0)})^T, \ldots, \left(x_{HP}^{(J,2^{m-J}-1)}\right)^T, \ldots, \right.$$
$$\left.(x_{HP}^{(1,0)})^T, \ldots, \left(x_{HP}^{(1,2^{m-J}-1)}\right)^T\right]^T.$$

The general structure of the Type 2 core DWT architecture is presented in FIG. 4. In this case connections between PEs (the dashed lines) belonging to the same pipeline stage are valid. As follows from FIG. 4 the Type 2 core DWT architecture is similar to the Type 1 core DWT architecture but now except for p inputs and two outputs (later on called main inputs and main outputs) every PE has additional p inputs and 2p outputs (later on called intermediate inputs and outputs). The 2p intermediate outputs of $PE_{j,i+p/2}$ are connected to the p intermediate inputs of $PE_{j,i}$, $i=0, \ldots, 2^{J-j}-p/2-1$. The other connections within the Type 2 core DWT architecture are similar to those within the Type 1 core DWT architecture.

The functionality of the blocks of the Type 2 core DWT architecture are substantially similar to those of the Type 1 core DWT architecture. The functionality of the data input block is exactly the same as for the case of the Type 1 core DWT architecture.

The data routing block (of the stage $j=1, \ldots, J$,) can, in general, be realized as an arbitrary circuitry which at the first time unit $n=0$ of its every operation step accepts a vector of $2^{J-j+1}$ components in parallel, and parallelly outputs a vector of the first $2^{J-j+1}+p-2$ components $0, 1, \ldots, 2^{J-j+1}+p-3$ of a vector which is the concatenation (in the chronological order) of the vectors accepted at the previous $\hat{Q}_j$ steps, where $\hat{Q}_j$ is defined in (8). Then at every time unit $n=0, \ldots, L_p-1$ of that operation step the data routing block parallelly outputs the next subvector of p components $2^{J-j+1}+np-2, \ldots, 2^{J-j+1}+(n+1)p-3$ of the same vector on its last p outputs.

The functionality of the PEs used in the Type 2 core DWT architecture at every time unit $n=0, \ldots, L_p-1$ of every operation step is to compute two inner products of a vector, say, x, either on its p main or p intermediate inputs with two vectors of predetermined coefficients, say LP' and HP' of length p as well as to compute a point-by-point product of x with LP'. At the time unit $n=0$ the vector x is formed using the main p inputs of the PE and at time units $n=1, \ldots, L_p-1$ vector x is formed using the intermediate inputs of the PE. Results of both inner products computed during one operation step are accumulated and are passed to the two main outputs of the PE while the results of the point-by-point products are passed to the intermediate outputs of the PE.

Similar to the case of the Type 1 core DWT architecture, it can be seen that the Type 2 core DWT architecture implements Algorithm 3.2 with time delay and time period characteristics given by (11) and (12). The other characteristics of the Type 1 and Type 2 architectures are also similar. In particular, the Type 2 architecture is very fast, may be implemented as a semisystolic architecture and with a varying level of parallelism, providing an opportunity for creating a trade-off between time and hardware complexities. A difference between these two architectures is that the shift registers of data routing blocks of the Type 1 core DWT architecture are replaced with additional connections between PEs within the Type 2 core DWT architecture.

A Possible Realisation of the Type 2 Core DWT Architecture

A possible structure of the jth pipeline stage, $j=1, \ldots, J$, for the Type 2 core DWT architecture is depicted in FIG. 9. An example of such a realisation for the case $L_{max}=6$, $J=3$ and $p=2$ is shown in FIG. 10. In this realisation the data routing block consists of $\hat{Q}_j$ chain connected groups of $2^{J-j+1}$ delays each, and a shift register of length $L_{max}-2$ which shifts the values upwards by p positions every time unit. The $2^{J-j+1}$ inputs to the stage are connected in parallel to the first group of delays, the outputs of which are connected to the inputs of the next group of delays etc. The outputs of the last $\hat{Q}_j$th group of delays form the first $2^{J-j+1}$ outputs of the data routing block and are connected to the main inputs of the PEs. The outputs of the $(\hat{Q}_j-t)$th group of delays, $t=1, \ldots, \hat{Q}_j-1$, are connected in parallel to the $2^{J-j+1}$ consecutive cells of the shift register. The outputs of the $(\hat{Q}_j-1)$st group of delays are connected to the first $2^{J-j+1}$ cells, the outputs of the $(\hat{Q}_j-2)$ nd group of delays are connected to the next $2^{J-j+1}$ cells etc. However, the first $q_j=(L_{max}-2)-(\hat{Q}_j-1)2^{J-j+1}$ inputs of the stage are directly connected to the last $q_j$ cells of the shift register. The outputs from the first p-2 cells of the shift register form the last p-2 outputs of the data routing block and are connected to the main inputs of the PEs according to the connections within the general structure. It can be shown that the presented realization satisfies the functionality constraint for the data routing block of the Type 2 core DWT architecture. Indeed, at the beginning of every step, the first $2^{J-j+1}+p-2$ components of the vector being the concatenation (in the chronological order) of the vectors accepted at previous $\hat{Q}_j$ steps are formed at the outputs of the data routing block and then during every following time unit the next p components of that vector are formed at its last p outputs.

A possible PE structure for the Type 2 core DWT architecture for the case of $p=2$ is presented in FIG. 10,b. It will be apparent to one of ordinary skill in the art that structures for arbitrary p and for $p=1$, $p=2$, and $p=L_{max}$, can be designed similar to those illustrated in FIGS. 8,(a),(b),(c), and (d).

It should be noted that in the case $p=L_{max}$ this realisation of the Type 2 core DWT architecture is the same as the realisation of the Type 1 core DWT architecture depicted in FIG. 6.

Multi-core DWT Architectures

The two types of core DWT architectures described above may be implemented with varying levels of parallelism depending on the parameter p. Further flexibility in the level of parallelism is achieved within multi-core DWT architectures by introducing a new parameter $r=1, \ldots, 2^{m-J}$. The multi-core DWT architecture is, in fact obtained from a corresponding single-core DWT architecture by expanding it r times. Its general structure is presented on FIG. 11. The architecture consists of a data input block and J pipeline stages each stage containing a data routing block and a block of PEs.

The data input block may be realized as word-serial or as word-parallel in a way similar to the case of core DWT architectures but in this case it now has $r2^J$ parallel outputs. which are connected to the $r2^J$ inputs of the data routing block of the first pipeline stage. The functionality of the data input block is to serially or parallelly accept and parallelly output a group of components of the input vector at the rate of $r2^J$ components per operation step.

Consider firstly the Type 1 multi-core DWT architecture. In this case, the jth pipeline stage, $j=1, \ldots, J$, consists of a data routing block having $r2^{J-j+1}$ inputs $I_{PS(j)}(0),),I_{PS(j)}(r2^{J-j+1}-1)$ forming the input to the stage, and $r2^{J-j+1}+p-2$ outputs $O_{DRB(j)}(0),),O_{DRB(j)}(r2^{J-j+1}+p-3)$ connected to the inputs of $r2^{J-j}$ PEs. Every PE has p inputs and two outputs where $p \leq L_{max}$ is a parameter of the realisation describing the level of parallelism of every PE. Consecutive p outputs $O_{DRB(j)}(2i), O_{DRB(j)}(2i+1), \ldots, O_{DRB(j)}(2i+p-1)$ of the data routing block of the jth, $j=1, \ldots, J$, stage are connected to the p inputs of the ith, $i=0, \ldots, r2^{J-j}-1$, PE ($PE_{j,i}$) of the same stage. First outputs of $r2^{J-j}$ PEs of the jth pipeline stage, $j=1, \ldots, J-1$, form the outputs $O_{PS(j)}(0), O_{PS(j)}(r2^{J-j}-1)$ of that stage and are connected to the $r2^{J-j}$ inputs $I_{PS(j+1)}(0), I_{PS(j+1)}(r2^{J-j}-1)$ of the data routing block of the next, (j+1)st, stage. First outputs of r PEs of the last, Jth, stage form first r outputs $out(0), \ldots, out(r-1)$ of the architecture. Second outputs of $r2^{J-j}$ PEs of the jth pipeline stage, $j=1, \ldots, J$, form the $(r2^{J-j})$th to $(r2^{J-j+1}-1)$st outputs $out(r2^{J-j}), \ldots, out(r2^{J-j+1}-1)$ of the architecture.

The data routing block (of the stage $j=1, \ldots, J$,) can, in general, be realized as an arbitrary circuitry which at the first time unit $n=0$ of its every operation step parallelly accepts a vector of $r2^{J-j+1}$ components, and then at every time unit $n=0, \ldots, L_p-1$ of that operation step it parallelly outputs a vector of $r2^{J-j+1}+p-2$ components $np, np+1, \ldots, (n+1)p+r2^{J-j}-3$ of a vector being the concatenation (in chronological order) of the vectors accepted at previous $\hat{Q}_j$ steps (see (8)). The functionality of the PEs is exactly the same as in the case of the Type 1 core DWT architecture.

Consider now the Type 2 multi-core DWT architecture. The data input block is exactly the same as in the case of the Type 1 multi-core DWT architecture. PEs used in the Type 2 multi-core DWT architecture and interconnections between them are similar to the case of the Type 2 (single)-core DWT architecture. The difference is that now there are $r2^{J-j}$ (instead of $2^{J-j}$) PEs within the jth pipeline stage, $j=1, \ldots, J$, of the architecture. Data routing block has now $r2^{J-j+1}$ inputs and $r2^{J-j+1}+p-2$ outputs with similar connections to PEs as in the case of the Type 1 multi-core DWT architecture. The data routing block (of the stage $j=1, \ldots, J$,) can, in general, be realized as an arbitrary circuitry which at the first time unit $n=0$ of its every operation step parallelly accepts a vector of $r2^{J-j+1}$ components, and parallelly outputs a vector of the first $r2^{J-j+1}+p-2$ components $0, 1, \ldots, r2^{J-j+1}+p-3$ of a vector being the concatenation (in the chronological order) of the vectors accepted at previous $\hat{Q}_j$ steps. Then at every time unit $n=0, \ldots, L_p-1$ of that operation step it parallelly outputs next subvector of p components $r2^{J-j+1}+np-2, \ldots, r2^{J-j+1}+(n+1)p-3$ of the same vector on its last p outputs.

The both types of multi-core DWT architectures are r times faster than the single-core DWT architectures, that is a linear speed-up with respect to the parameter r is achieved. The delay between input and corresponding output vectors is equal to $$T_d(C1) = (2^{m-J} + \hat{s}(J))\lceil L/p \rceil / r \quad (14)$$

time units and the throughput or the time period is equal to $$T_p(C1) = 2^{m-J} \lceil L/p \rceil / r \quad (15)$$

time units. Thus further speed-up and flexibility for trade-off between time and hardware complexities is achieved within multi-core DWT architectures. In addition, the architectures are modular and regular and may be implemented as semi-systolic arrays.

As a possible realisation of the multi-core DWT architecture for the case of $p=L=L_{max}$ and $r=2^{m-J}$ the DWT flowgraph itself (see FIG. 2) may be considered where nodes (rectangles) represent PEs and small circles represent latches.

The Variable Resolution DWT Architecture

The above-described architectures implement DWTs with the number of octaves not exceeding a given number J. They may implement DWTs with smaller than J number of octaves though with some loss in hardware utilisation. The variable resolution DWT architecture implements DWTs with an arbitrary number J' of octaves whereas the efficiency of the architecture remains approximately 100% whenever J' is larger than or equal to a given number $J_{min}$.

The general structure of the variable resolution DWT architecture is shown on FIG. 12(a). It consists of a core DWT architecture corresponding to $J_{min}$ decomposition levels and an arbitrary serial DWT architecture, for, instance, an RPA-based one ([14]–[17], [19]–[20], [22]). The core DWT architecture implements the first $J_{min}$ octaves of the J'-octave DWT. The low-pass results from the out(0) of the core DWT architecture are passed to the serial DWT architecture. The serial DWT architecture implements the last $J'-J_{min}$ octaves of the J'-octave DWT. Since the core DWT architecture may be implemented with varying level of parallelism it can be balanced with the serial DWT architecture in such a way that approximately 100% of hardware utilisation is achieved whenever $J' \geq J_{min}$.

To achieve the balancing between the two parts the core DWT architecture must implementent a $J_{min}$-octave N-point DWT with the same throughput or faster as the serial architecture implements ($J'-J_{min}$)-octave M-point DWT (M= ($N/2^{J_{min}}$)). Serial architectures found in the literature implement a M-point DWT either in 2M time units ([14], [15]) or in M time units ([14]–[19]) correspondingly employing either L or 2L basic units (BUs, multiplier-adder pairs). They can be scaled down to contain an arbitrary number $K \leq 2L$ of BUs so that an M-point DWT would be implemented in $M\lceil 2L/K \rceil$ time units. Since the (Type 1 or Type 2) core DWT architecture implements a $J_{min}$-octave N-point DWT in $N\lceil L/p \rceil / 2^{J_{min}}$ time units the balancing condition becomes $\lceil L/p \rceil \leq \lceil 2L/K \rceil$ which will be satisfied if $p = \lceil K/2 \rceil$. With this condition the variable resolution DWT architecture will consist of a total number $$A = 2p(2^{J_{min}} - 1) + K = \begin{cases} K2^{J_{min}}, & \text{if } K \text{ is even} \\ (K+1)2^{J_{min}} - 1, & \text{if } K \text{ is odd} \end{cases}$$

of BUs and will implement a J'-octave N-point DWT in $$T_d = N\lceil 2L/K \rceil / 2^{J_{min}}$$

time units.

A variable resolution DWT architecture based on a multi-core DWT architecture may also be constructed (see FIG. 12(b)) where now a data routing block is inserted between the multi-core and serial DWT architectures. The functionality of the data routing block is to parallelly accept and serially output digits at the rate of r samples per operation step. The balancing condition in this case is $rp = \lceil K/2 \rceil$, and the area time characteristics are $$A = 2pr(2^{J_{min}} - 1) + K = \begin{cases} K2^{J_{min}}, & \text{if } K \text{ is even} \\ (K+1)2^{J_{min}} - 1, & \text{if } K \text{ is odd} \end{cases},$$

$$T_d = N\lceil 2L/K \rceil / 2^{J_{min}}$$

Table 1 presents a comparative performance of the proposed architectures with some conventional architectures. In this table, as it is commonly accepted in the literature, the area of the architectures was counted as the number of used multiplier-adder pairs which are the basic units (BUs) in DWT architectures. The time unit is counted as time period of one multiplication since this is the critical pipeline stage. Characteristics of the DWT architectures proposed according to the invention shown in the last seven rows in Table 1, are given as for arbitrary realisation parameters $L_{max}$, p, and r as well as for some examples of parameter choices. It should be mentioned that the numbers of BUs used in the proposed architectures are given assuming the PE examples of FIG. 8 (where PE with p inputs contains 2p BUs). However, PEs could be further optimized to involve less number of BUs.

For convenience, in Table 2 numerical examples of Area-time characteristics are presented for the choice of the DWT parameters J=3 or J=4, N=1024, and L=9 (which corresponds to the most popular DWT, the Daubechies 9/7 wavelet). Table 3 presents numerical examples for the case J=3 or J=4, N=1024, and 5 (the Daubechies 5/3 wavelet). The gate counts presented in these tables have been found assuming that a BU consists of a 16-bit Booth multiplier followed by a hierarchical 32-bit adder and thus involves a total of 1914 gates (see [37]). FIG. 13 gives a graphical representation of some rows from Table 2. It should be noted that the line corresponding to the proposed architectures may be continued much longer though these non-present cases require rather large silicon area which might be impractical at the current state of the technology.

As follows from these illustrations, the proposed architectures, compared to the conventional ones, demonstrate excellent time characteristics at moderate area requirements. Advantages of the proposed architectures are best seen when considering the performances with respect to $AT_p^2$ criterion, which is commonly used to estimate performances of high-speed oriented architectures. Note that the first row of the Tables represent a general purpose DSP architecture. Architectures presented in the next two rows are either non-pipelined or restricted (only two stage) pipelined ones and they operate at approximately 100% hardware utilisation as is the case for our proposed architectures. So their performance is "proportional" to the performance of our architectures which however are much more flexible in the level of parallelism resulting in a wide range of time and area complexities. The fourth row of the tables presents J stage pipelined architectures with poor hardware utilisation and consequently a poor performance. The fifth to seventh rows of the tables present architectures from previous publications which are J stage pipelined and achieve 100% hardware utilisation and good performance but do not allow a flexible range of area and time complexities as do the architectures proposed according to the invention.

In the foregoing there has been discussion of general structures of "universal" wavelet transformers which are able to implement the wavelet transform with arbitrary parameters such as the filter lengths and coefficients, input length, and the number of decomposition levels. Further optimisation of architectures for a specific discrete wavelet transform (corresponding to a specific set of above parameters) is possible by optimizing the structure of processing elements (PEs) included in the architecture.

The invention can be implemented as a dedicated semi-systolic VLSI circuit using CMOS technology. This can be either a stand-alone device or an embedded accelerator to a general-purpose processor. The proposed architectures can be implemented with varying level of parallelism which leads to varying cost and performance. The choice of the mode of implementation as well as the desired level of parallelism depends on the application field. The architectures as they have been described are dedicated to arbitrary DWTs. However, they can be further optimized and implemented as dedicated to a specific DWT. This may be desirable in application to, e.g. JPEG 2000 where Daubechies 5/3 or 9/7 wavelets are planned to be the basic DWTs.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

| Abbreviations | |
|---|---|
| ASIC | Application Specific Integrated Circuits |
| CMOS | Complementary Metal Oxide Silicon |
| DSP | Digital Signal Processor |
| DWT | Discrete Wavelet Transform |
| FPP | Fully Parallel-Pipelined (DWT architecture) |
| LPP | Limited Parallel-Pipelined (DWT architecture) |
| PE | Processor element |

REFERENCES

[1] S. G. Mallat, "A Theory for Multiresolution Signal Decomposition: The Wavelet Representation," *IEEE Trans. on Pattern Analysis and Machine Intelligence*, Vol. 2, n. 12, December 1989, pp. 674–693.

[2] M. Vetterli and J. Kovacevic, *Wavelets and Subband Coding*, Englewood Cliffs (N.J.): Prentice-Hall, 1995.

[3] I. Daubachies, *Ten Lectures on Wavelets*, Philadelphia (Pa.): SIAM, 1992.

[4] I. Daubechies, "The Wavelet Transform, Time Frequency, Localization and Signal Analysis," *IEEE Trans. on Information Theory*, vol. 36, n. 5, September 1990, pp. 961–1005.

[5] G. Beylkin, R. Coifman, and V. Rokhlin, *Wavelet in Numerical Analysis in Wavelets and their Applications*, New York (N.Y.): Jones and Bartlett, 1992, pp. 181–210.

[6] G. Beylkin, R. Coifman, and V. Rokhlin, *Fast Wavelet Transforms and Numerical Algorithms*, New Haven (Conn.): Yale Univ., 1989.

[7] L. Senhadji, G. Carrault, and J. J. Bellanguer, "Interictal EEG Spike Detection: A New Framework Based on The Wavelet Transforms," in *Proc. IEEE-SP Int. Symp. Time-Frequency Time-Scale Anal.*, Philadelphia (Pa.) October 1994, pp. 548–551.

[8] S. G. Mallat, "Multifrequency Channel Decompositions of Images and Wavelet Models," *IEEE Trans. on Acoust., Speech, Signal Processing*, vol. 37, n. 12, 1989, pp. 2091–2110.

[9] Z. Mou and P. Duhamel, "Short-Length FIR Filters and Their Use in Fast Non Recursive Filtering," *IEEE Trans. on Signal Processing*, vol. 39, n. 6, June 1991, pp. 1322–1332.

[10] A. N. Akansu and R. A. Haddad, *Multiresolution Signal Decomposition: Transforms, Subbands and Wavelets*, New York (N.Y.): Academic, 1992.

[11] R. Kronland-Martinet, J. Morlet, and A. Grossman, "Analysis of Sound Patterns through Wavelet Transform," *Int. Journ. Pattern Recognitiona and Artificial Intell.*, vol. 1, n.2, 1987, pp. 273–302.

[12] S. B. Pan, and R. H. Park, "New Systolic Arrays for Computation of the 1-D Discrete Wavelet Transform,"

Proceedings of the IEEE International Conference on Acoustics, Speech, and Signal Processing, 1997, Vol. 5, 1997, pp. 4113–4116.

[13] A. B. Premkumar, and A. S. Madhukumar, "An Efficient VLSI Architecture for the Computation of 1-D Discrete Wavelet Transform," Proc. of the IEEE Int. Conf. On Information, Communications and Signal

[14] M. Vishwanath, R. M. Owens, and M. J. Irwin, "VLSI Architectures for the Discrete Wavelet Transform," IEEE Trans. on Circ. and Syst. II: Analog and Digital Signal Processing, vol. 42, n. 5, May 1995, pp. 305–316.

[15] J. Fridman, and S. Manolakos, "Discrete Wavelet Transform: Data Dependence Analysis and Synthesis of Distributed Memory and Control Array Architectures," IEEE Trans. on Signal Processing, vol. 45, n. 5, May 1997, pp. 1291–1308.

[16] K. K. Parhi, and T. Nishitani, "VLSI Architectures for Discrete Wavelet Transforms," IEEE Trans. on VLSI Systems, vol. 1, n.2, 1993, pp. 191–202.

[17] T. C. Denk, and K. K. Parhi, "Systolic VLSI Architectures for 1-D Discrete Wavelet Transform," Proceedings of the Thirty-Second Asilomar Conference on Signals, Systems & Computers, 1998, vol. 2 pp. 1220–1224.

[18] G. Knowles, "VLSI Architecture for the Discrete Wavelet Transform," Electronics Letters, vol. 26, n. 15, 1990, pp. 1184–1185.

[19] C. Chakrabarti and M. Vishwanath, "Efficient Realizations of Discrete and Continuous Wavelet Transforms: From Single Chip Implementations to Mappings on SIMD Array Computers," IEEE Trans. on Signal Processing, vol. 43, n. 3, 1995, pp. 759–771.

[20] C. Chakrabarti, M. Vishwanath, and R. M. Owens, "Architectures for Wavelet Transforms: A Survey," Journal of VLSI Signal Processing, vol. 14, n. 2, 1996, pp. 171–192.

[21] A. Grzeszczak, M. K. Mandal, S. Panchanatan, "VLSI Implementation of Discrete Wavelet Transform," IEEE Trans. on VLSI Systems, vol. 4, n. 4, December 1996, pp. 421–433.

[22] M. Vishwanath, and R. M. Owens, "A Common Architecture for the DWT and IDWT," Proceedings of IEEE Int. Conf. on Application Specific Systems, Architectures and Processors, 1996, pp. 193–198.

[23] C. Yu, C. H. Hsieh, amd S. J. Chen, "Desing and Implementation of a Highly Efficient VLSI Architecture for Discrete Wavelet Transforms," Proceedings of IEEE Int. Conf. on Custom Integrated Circuits, 1997, pp. 237–240.

[24] S. B. Syed, M. A. Bayoumi, "A Scalable Architecture for Discrete Wavelet Transform," Proceedings of Computer Architectures for Machine Perception (CAMP '95), 1995, pp. 44–50.

[26] M. Vishwanath, "The Recursive Pyramid Algorithm for the Discrete Wavelet Transfomr," IEEE Transactions on Signal Processing, vol. 42, n. 3, 1994, pp. 673–677.

[27] D. Liu, C. Svensson, "Trading Sped for Low Power by choice of Supply and Threshold Voltages," IEEE Journal of Solid State Cirtcuits, vol. 28, n. 1, 1993, pp. 10–17.

[28] H. T. Kung, "Why Systolic Architectures?" IEEE Computer, 1982.

[30] F. Marino, D. Gevorkian, and J. Astola, "High-Speeed/Low-Power 1-D DWT Architectures with high efficiency," in Proceedings of the IEEE International Conference on Circuits and Systems, May 28–31, Geneva, Switzerland, vol. 5, pp. 337–340.

[31] D. Z. Gevorkian, Computational Aspects of Discrete Linear Transforms and Rank Order Based Filters, Thesis for the degree of Doctor of Technology, May 1997, 214 pages.

[32] J. T. Astola, S. S. Agaian, and D. Z. Gevorkian, "Parallel algorithms and architectures for a family of Haar-like transforms," in Proceedings of SPIE's International Symposium on Electronic Imaging: Science and Technology, vol. 2421, February, 1995, San Jose, Calif., USA.

[34] D. Gevorkian, F. Marino, S. Agaian, and J. Astola, "Flowgraph representation of discrete wavelet transforms and wavelet packets for their efficient parallel implementation," to appear in Proceedings of TICSP Int. Workshop on Spectral Transforms and Logic Design for Future Digital Systems, Jun. 2–3, 2000, Tampere, Finland.

[36] http://www.ti.com/sc/docs/products/dsp/c6000/benchmarks/64x.htm#filters

[37] P. Pirsch, Architectures for Digital Signal Processing, J. Willey & Sons, 1998, 419 pages.

What is claimed is:

1. A microprocessor structure for performing a discrete wavelet transform operation, said discrete wavelet transform operation comprising decomposition of an input signal vector comprising a number of input samples, over a specified number of decomposition levels j, where j is an integer in the range 1 to J, starting from a first decomposition level and progressing to a final decomposition level, said microprocessor structure having a number of processing stages, each of said stages corresponding to a decomposition level j of the discrete wavelet transform and being implemented by a number of basic processing elements, the number of basic processing elements implemented in each of said processing stages decreasing by a constant factor at each increasing decomposition level j.

2. A microprocessor structure according to claim 1, wherein the input signal vector comprises $r \times k^m$ input samples, r, k and m being non-zero positive integers and the number of basic processing elements implemented in each of said processing stages of said microprocessor structure decreases by a factor of k from a decomposition level j to a decomposition level j+1.

3. A microprocessor structure according to claim 2 the microprocessor structure being arranged to process all of said $r \times k^m$ input samples of said input vector in parallel.

4. A microprocessor structure according to claim 2 further comprising $r \times k^m$ inputs arranged to receive all of said $r \times k^m$ input samples of said input vector in parallel.

5. A microprocessor structure according to claim 2 wherein the number of said basic processing elements in the first processing stage is equal to $r \times k^{m-1}$.

6. A microprocessor structure according to claim 2, wherein each basic processing element of each processing stage has a predetermined number of inputs and is arranged to perform a set of k inner product operations between k sets of coefficient values and a set of input values received in parallel at said predetermined number of inputs, the number of said inputs, the number of said coefficient values in a set and the number of said input values received in parallel each being equal to a filter length L used to form said k inner products, said basic processing element further comprising k outputs, each output arranged to output an output value corresponding to a result of one of said set of k inner products performed between one of said k sets of coefficient values and said set of input values.

7. A microprocessor structure according to claim 2, wherein each basic processing element of each processing stage has a predetermined number of inputs and is arranged to perform a set of k inner product operations between k sets of coefficient values and a set of input values received in parallel at said predetermined number of inputs, the number of said inputs and the number of said input values received in parallel being equal to a filter length $L_{long}$, where $L_{long}$ is the largest number of coefficient values used to form any of said k inner products, said basic processing element further comprising k outputs, each output arranged to output an output value corresponding to a result of one of said set of k inner products performed between one of said k sets of coefficient values and said set of L input values.

8. A microprocessor structure according to claim 2, wherein at least one of the processing stages 2 to J, further comprises a data routing block arranged to receive a specified one of said k outputs values from each of the basic processing elements of an immediately preceding processing stage j−1, said routing block being further arranged to group said specified ones of said k output values into sets of L output values and to supply said sets of L output values in parallel to the inputs of the basic processing elements of processing stage j, such that each basic processing element of processing stage j receives a predetermined set of L output values obtained from said immediately preceding processing stage j−1.

9. A microprocessor structure according to claim 2 wherein each basic processing element of each processing stage has a predetermined number of inputs and is arranged to perform k inner product operations between k sets of coefficient values and a set of input values received in parallel at said predetermined number of inputs, the number of said inputs, the number of said coefficient values in a set and the number of said input values received in parallel each being equal to a filter length L used to form the k inner products, said basic processing element further comprising k outputs, each output arranged to output respective ones of the k inner products, the microprocessor structure further comprising a data routing block arranged to receive k inner products from the basic processing elements which performs a stride permutation to group together inner products from like filtering operations of each of the processing elements.

10. A microprocessor structure according to claim 2, wherein the microprocessor structure comprises at least one core processing unit, said core processing unit comprising $k^{J-j}$ basic processing elements at each processing stage j.

11. A microprocessor structure according to claim 10, wherein each basic processing element of each processing stage has a predetermined number of inputs and is arranged to perform a set of k inner product operations between k sets of coefficient values and a set of input values received in parallel at said predetermined number of inputs, the number of said inputs, the number of said coefficient values in a set and the number of said input values received in parallel each being equal to a filter length L used to perform said k inner product operations, each basic processing element further comprising k outputs, each output arranged to output an output value corresponding to a result of one of said k inner product operations performed between one of said k sets of coefficient values and said set of input values.

12. A microprocessor structure according to claim 10, wherein at least one of said processing stages 2 to J further comprises a data routing block arranged to receive said k output values from each of the basic processing elements of an immediately preceding processing stage j−1, said routing block being further arranged to group together selected ones of said k output values into sets of L output values and to supply said sets of L output values in parallel to the inputs of the basic processing element of processing stage, in such a way that each basic processing element of processing stage j receives a predetermined set of L output values received from said immediately preceding processing stage j−1.

13. A microprocessor structure according to claim 12, wherein the number of samples appended to sub-vector i is L/2.

14. A microprocessor structure according to claim 10, wherein the processing stage corresponding to the first decomposition level further comprises a routing block arranged to receive said consecutive sub-vectors i comprising $k^J$ input samples, said routing block being arranged to form said $k^J$ input samples into sets of L input samples, by arranging the sub-vectors i to be exactly divisible into said sets of L by appending a number of samples from an immediately subsequent sub-vector i+1, said routing block being further arranged to supply said sets of L input samples in parallel to the inputs of the basic processing elements of the first processing stage, such that each basic processing element of the first processing stage receives a predetermined set of L input samples.

15. A microprocessor structure according to claim 14 further comprising a shift register arranged to form the sub-vectors from the vector of input samples.

16. A microprocessor structure according to claim 10, wherein said microprocessor is arranged to receive sub-vector comprising $k^J$ input samples of said $r \times k^m$ input samples of said input vector.

17. A microprocessor structure according to claim 16 which is arranged to receive the $k^J$ input samples in parallel.

18. A microprocessor structure according to claim 16, wherein the first processing stage of the microprocessor structure is arranged to receive said vector of $r \times k^m$ input samples progressively in time, as consecutive sub-vectors.

19. A microprocessor structure according to claim 18 wherein at least one processing stage is arranged to process a sub-vector i in a first time period which includes at least one sample from a sub-vector i+1 in a second time period immediately consecutive to the first time period.

20. A microprocessor structure according to claim 19 wherein the at least one processing stage is arranged to process the sub-vector i appended with L/2 samples from the sub-vector i+1.

21. A microprocessor structure according to claim 10, wherein each basic processing element of each processing stage has a predetermined number of inputs p and is arranged to perform a set of k inner product operations between k sets of coefficient values and a set of input values, the total number of said input values in a set and the number of coefficient values in a set being equal to L, where L is selectable in a range from 1 to $L_{max}$, said basic processing element being further arranged to receive a set of p input values in parallel at said p inputs at a given time and to perform a sub-set of inner product operations comprising k inner product operations between p coefficient values and said p input values in a given operating period.

22. A microprocessor structure according to claim 21, wherein each basic processing element is arranged to receive a set of p input values at consecutive operating periods.

23. A microprocessor structure according to claim 21, wherein each basic processing element further comprises k outputs, each output arranged to output an output value corresponding to a result of one of said k inner product operations performed between one of said k sets of coefficient values and said set of input values.

24. A microprocessor structure according to claim 21, wherein at least one of the processing stages 2 to J, further comprises a data routing block arranged to receive said k output values from each of the basic processing elements of an immediately preceding processing stage j−1, said routing block being further arranged to group specified ones of said k output values into sets of L output values and to supply said sets of L output values in consecutive groups of p values in parallel to the p inputs of the basic processing elements of processing stage j at successive operating periods.

25. A microprocessor structure according to claim 21, wherein the processing stage corresponding to the first decomposition level further comprises a routing block arranged to receive said consecutive sub-vectors i comprising $k^J$ input samples, said routing block being arranged to form said $k^J$ input samples into sets of L input samples, by arranging the sub-vectors i to be exactly divisible into said sets of L by appending a number of samples from an immediately subsequent sub-vector i+1, said routing block being further arranged to supply said sets of L in consecutive groups of p values in parallel to the p inputs of the basic processing elements of the first processing stage at successive operating periods.

26. A microprocessor structure according to claim 21, wherein at least one basic processing element is functionally connected to at least one other basic processing element of the same processing stage j.

27. A microprocessor structure according to claim 21, wherein at least a first basic processing element of a processing stage j is arranged to receive an input from a second basic processing element in the same processing stage j.

28. A microprocessor structure according to claim 27, wherein said input from said second basic processing element in the same processing stage is a set of p values representing p intermediate results of inner product operations performed in said second basic processing element in an earlier operating period and said first basic processing element is arranged to use said set of p intermediate results in performing its inner product operations in a current operating period.

29. A microprocessor structure according to claim 28, wherein said p intermediate results are received in parallel at said first basic processing element.

30. A microprocessor structure according to claim 28, wherein said first basic processing element receives a set of p input values from said second basic processing element at each successive operating period, after an initial first operating period.

31. A microprocessor structure according to claim 21, integrated in a single device with a second microprocessor structure for performing a discrete wavelet transform, said second microprocessor structure being arranged to perform at least one further decomposition level in addition to said final decomposition level J.

32. A microprocessor structure according to claim 10, integrated in a single device with a second microprocessor structure for performing a discrete wavelet transform, said second microprocessor structure being arranged to perform at least one further decomposition level in addition to said final decomposition level J.

33. A microprocessor structure according to claim 1, wherein each basic processing element of each processing stage has a predetermined number of inputs and is arranged to perform two inner products between two sets of coefficient values and a set of input values received in parallel at said L inputs, a first of said two inner products representing a low-pass filtering operation and a second of said two inner products representing a high-pass filtering operation, the number of said inputs, the number of said coefficient values and the number of said input values received in parallel being equal to a filter length L used to form said two inner products, said basic processing element further comprising two outputs, a first output arranged to output a low-pass filtered output value corresponding to a result of the low-pass filtering operation performed on said set of input values, and a second output being arranged to output a high-pass filtered output value corresponding to a result of the high-pass filtering operation performed on said set of input values.

34. A microprocessor structure according to claim 1, wherein at least one of the processing stages 2 to J, further comprises a routing block arranged to receive low-pass filtered output values from each of the basic processing elements of an immediately preceding processing stage j−1, said routing block being further arranged to group said low-pass filtered output values into sets of L low-pass filtered output values and to supply said sets of L low-pass filtered output values in parallel to the inputs of the basic processing elements of processing stage j, such that each basic processing element of processing stage j receives a predetermined set of L low-pass filtered output values obtained from said immediately preceding processing stage j−1.

35. A microprocessor structure according to claim 1, wherein the processing stage corresponding to said first decomposition level further comprises a routing block arranged to receive said $r \times k^m$ input samples of said input vector, said routing block being arranged to group said $r \times k^m$ input samples into sets of L input samples and to supply said sets of L input samples in parallel to the inputs of the basic processing elements of the first processing stage, such that each basic processing element of the first processing stage receives a predetermined set of L input samples.

36. A microprocessor structure according to claim 1, wherein the processing stage corresponding to said first decomposition level further comprises a routing block arranged to receive $2^m$ input samples of said input vector, said routing block being arranged to group said $2^m$ input samples into sets of L input samples and to supply said sets of L input samples in parallel to the inputs of the basic processing elements of the first processing stage, such that each basic processing element of the first processing stage receives a predetermined set of L input samples.

37. A microprocessor structure according to claim 1 wherein each basic processing element of each processing stage has a predetermined number of inputs and is arranged to perform two inner product operations between two sets of coefficient values and a set of input values received in parallel at said predetermined number of inputs, the number of said inputs, the number of said coefficient values in a set and the number of said input values received in parallel each being equal to a filter length L used to form the two inner products, said basic processing element further comprising two outputs, each output arranged to output respective ones of the two inner products, the microprocessor structure further comprising a data routing block arranged to receive pairs of inner products from the basic processing elements which performs a perfect unshuffle operation to group together inner products from like filtering operations from each of the processing elements.

38. A microprocessor structure according to claim 1, wherein each of said basic processing elements being arranged to perform high and low pass filtering operations, and a discrete wavelet transform result to an arbitrary decomposition level j, is formed by a vector constructed from output values from a high-pass filtering operation and a low-pass filtering operation at a processing stage corresponding to the arbitrary decomposition level j and output values from high-pass filtering operations of all preceding processing stages.

39. A microprocessor structure according to claim 1, wherein each basic processing element is arranged to execute a basic operating cycle in a period of time which is substantially the same for all basic processing elements.

40. A microprocessor structure according to claim 1, wherein all of said basic processing elements are implemented to perform identical operations.

41. A microprocessor structure according to claim 1, wherein at least one basic processing element is functionally connected to at least one other basic processing element of the same processing stage.

42. A microprocessor structure according to claim 1, integrated in a single device with a second microprocessor structure for performing a discrete wavelet transform, said second microprocessor structure being arranged to perform at least one further decomposition level in addition to said final decomposition level J.

43. A microprocessor structure according to claim 42, wherein said second microprocessor structure is arranged to perform a recursive pyramid algorithm.

44. A microprocessor structure according to claim 1, wherein a plurality of the basic processing elements of the microprocessor structure are arranged to form at least one core processing unit, said core processing unit arranged to perform a $k_J$-point wavelet transform operation.

* * * * *